United States Patent
Bergqvist et al.

(10) Patent No.: US 12,335,859 B2
(45) Date of Patent: Jun. 17, 2025

(54) METHOD AND APPARATUS FOR CELL SELECTION IN A WIRELESS COMMUNICATION NETWORK

(71) Applicant: Telefonaktiebolaget LM Ericsson (publ), Stockholm (SE)

(72) Inventors: Jens Bergqvist, Linköping (SE); Sebastian Lindqvist, Norrköping (SE); Patrik Rugeland, Stockholm (SE); Meysam Aghighi, Linköping (SE); Stefan Engström, Linköping (SE); Oumer Teyeb, Montréal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 17/440,083

(22) PCT Filed: Mar. 27, 2020

(86) PCT No.: PCT/EP2020/058844
§ 371 (c)(1),
(2) Date: Sep. 16, 2021

(87) PCT Pub. No.: WO2020/193789
PCT Pub. Date: Oct. 1, 2020

(65) Prior Publication Data
US 2022/0191779 A1 Jun. 16, 2022

Related U.S. Application Data

(60) Provisional application No. 62/825,229, filed on Mar. 28, 2019.

(51) Int. Cl.
*H04W 48/20* (2009.01)
*H04W 24/10* (2009.01)
(Continued)

(52) U.S. Cl.
CPC .......... *H04W 48/20* (2013.01); *H04W 24/10* (2013.01); *H04W 48/16* (2013.01); *H04W 76/15* (2018.02)

(58) Field of Classification Search
CPC ..... H04W 26/22; H04W 36/24; H04W 36/30; H04W 36/0079; H04W 72/56;
(Continued)

(56) References Cited

U.S. PATENT DOCUMENTS 5,511,066 A * 4/1996 Witters ............. H04Q 11/0478
370/230.1
9,521,514 B2 * 12/2016 Miller ................... H04W 48/02
(Continued)

FOREIGN PATENT DOCUMENTS

EP        3018944 A1     5/2016
WO    WO-2020193789 A1 * 10/2020 ............ H04W 24/10

OTHER PUBLICATIONS

S. Won and S. W. Choi, "Three Decades of 3GPP Target Cell Search through 3G, 4G, and 5G," in IEEE Access, vol. 8, pp. 116914-116960, 2020, doi: 10.1109/ACCESS.2020.3003012. (Year: 2020).*
(Continued)

*Primary Examiner* — William D Cumming
(74) *Attorney, Agent, or Firm* — Murphy, Bilak & Homiller, PLLC

(57) ABSTRACT

An example wireless device (12) in a dormant state improves its selection of a camping cell by accounting for multi-cell configurations. Among other things, a multi-cell configuration may improve throughput between a wireless communication network (10) and the wireless device (12), based on the network (10) serving the wireless device (12) from two or more cells (24). By camping on a cell (24) that belongs to a multi-cell configuration that is possible for the wireless device (12), the wireless device (12) reduces the
(Continued)

time and signaling needed to establish that multi-cell configuration, upon the wireless device (12) connecting to the network (10) via the camping cell. Accounting for multi-cell configurations may be done jointly, along with accounting for conventional priorities, such as conventionally-prioritized frequencies and Radio Access Technologies (RATs) and may be incorporated into the ranking of cells (24) based on per-cell radio-signal measurements.

6 Claims, 15 Drawing Sheets

(51) Int. Cl.
 *H04W 48/16* (2009.01)
 *H04W 76/15* (2018.01)
(58) Field of Classification Search
 CPC . H04W 24/10; H04W 36/0088; H04W 36/22; H04W 4/06; H04W 48/02; H04W 72/1268; H04W 4/25; H04W 36/00837; H04W 36/302
 USPC .................... 370/230.1, 331, 329; 455/456.4
 See application file for complete search history.

(56) References Cited

U.S. PATENT DOCUMENTS

| | | | |
|---|---|---|---|
| 9,907,003 B2* | 2/2018 | Pao | H04W 36/22 |
| 10,182,383 B2* | 1/2019 | Pao | H04W 36/0088 |
| 10,264,560 B2* | 4/2019 | Yang | H04W 72/56 |
| 11,856,467 B2* | 12/2023 | Koskela | H04B 7/0617 |
| 12,028,877 B2* | 7/2024 | Wang | H04W 76/28 |
| 2016/0127956 A1 | 5/2016 | Jujaray et al. | |
| 2016/0150366 A1* | 5/2016 | Miller | H04W 4/08 455/456.4 |
| 2018/0132155 A1* | 5/2018 | Pao | H04W 36/22 |
| 2022/0191779 A1* | 6/2022 | Bergqvist | H04W 24/10 |
| 2023/0023041 A1* | 1/2023 | Yi | H04L 5/0048 |
| 2023/0156540 A1* | 5/2023 | Wang | H04W 36/00837 370/331 |
| 2023/0209627 A1* | 6/2023 | Wu | H04L 5/0094 370/329 |
| 2023/0354453 A1* | 11/2023 | Uesaka | H04W 72/1268 |
| 2023/0362762 A1* | 11/2023 | Yang | H04W 36/302 |
| 2023/0397117 A1* | 12/2023 | Pan | H04W 76/27 |
| 2024/0187943 A1* | 6/2024 | Murugan | H04W 36/0058 |
| 2024/0244492 A1* | 7/2024 | Nishant | H04W 36/0069 |
| 2024/0340744 A1* | 10/2024 | Soni | H04W 36/302 |
| 2024/0381256 A1* | 11/2024 | Ye | H04W 52/0216 |

OTHER PUBLICATIONS

Ericsson, et al., "WID on Multi-RAT Dual-Connectivity and Carrier Aggregation enhancements (LTE_NR_DC_CA_enh-Core)", 3GPP TSG-RAN#81; RP-182076; Gold Coast, Australia, Sep. 10-13, 2018, 1-5.

3GPP, "3GPP TS 36.101 V16.2.0", 3rd Generation Partnership Project; Technical Specification Group Radio Access Network; Evolved Universal Terrestrial Radio Access (E-UTRA); User Equipment (UE) radio transmission and reception (Release 16), Jun. 2019, 1-1859.

3GPP, "3GPP TS 37.340 V15.8.0", 3rd Generation Partnership Project; Technical Specification Group Radio Access Network; Evolved Universal Terrestrial Radio Access (E-UTRA) and NR; Multi-connectivity; Stage 2 (Release 15), Dec. 2019, 1-71.

3GPP, "3GPP TS 38.133 V15.6.0", 3rd Generation Partnership Project; Technical Specification Group Radio Access Network; NR; Requirements for support of radio resource management (Release 15), Jun. 2019, 1-999.

3GPP, "3rd Generation Partnership Project; Technical Specification Group Radio Access Network; Evolved Universal Terrestrial Radio Access (E-UTRA); User Equipment (UE) procedures in idle mode (Release 15)", TS 36.304 V15.2.0, Dec. 2018, 1-55.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 1-962.

3GPP, "3rd Generation Partnership Project; Technical Specification Group Radio Access Network; NR; NR and NG-RAN Overall Description; Stage 2 (Release 15)", 3GPP TS 38.300 V15.3.1, Oct. 2018, 1-92.

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 1-527.

3GPP, "3rd Generation Partnership Project; Technical Specification Group Radio Access Network; NR; User Equipment (UE) procedures in Idle mode and RRC Inactive state (Release 15)", 3GPP TS 38.304 V15.2.0, Dec. 2018, 1-28.

Ericsson, et al., "Cell-specific prioritisation at reselection", 3GPP TSG-RAN WG2 #82, Tdoc R2-131668, Fukuoka, Japan, May 20-24, 2013, 1-5.

Huawei, et al., "Distributing idle UEs to multiple carriers", 3GPP TSG-RAN WG2 Meeting #91, R2-153402, Beijing, China, Aug. 24-28, 2015, 1-4.

* cited by examiner

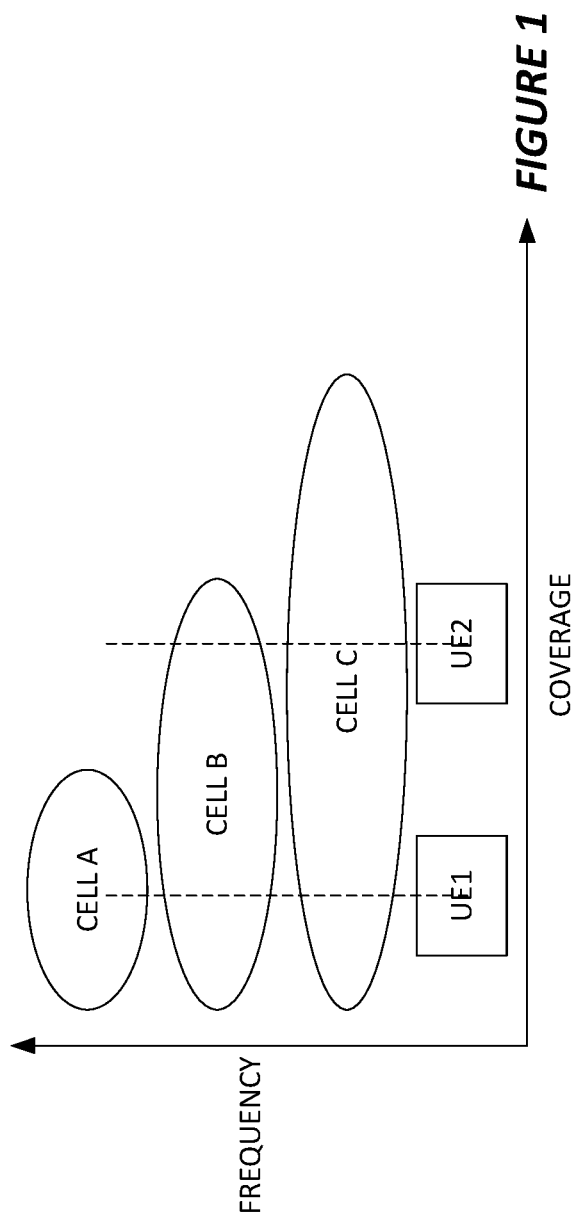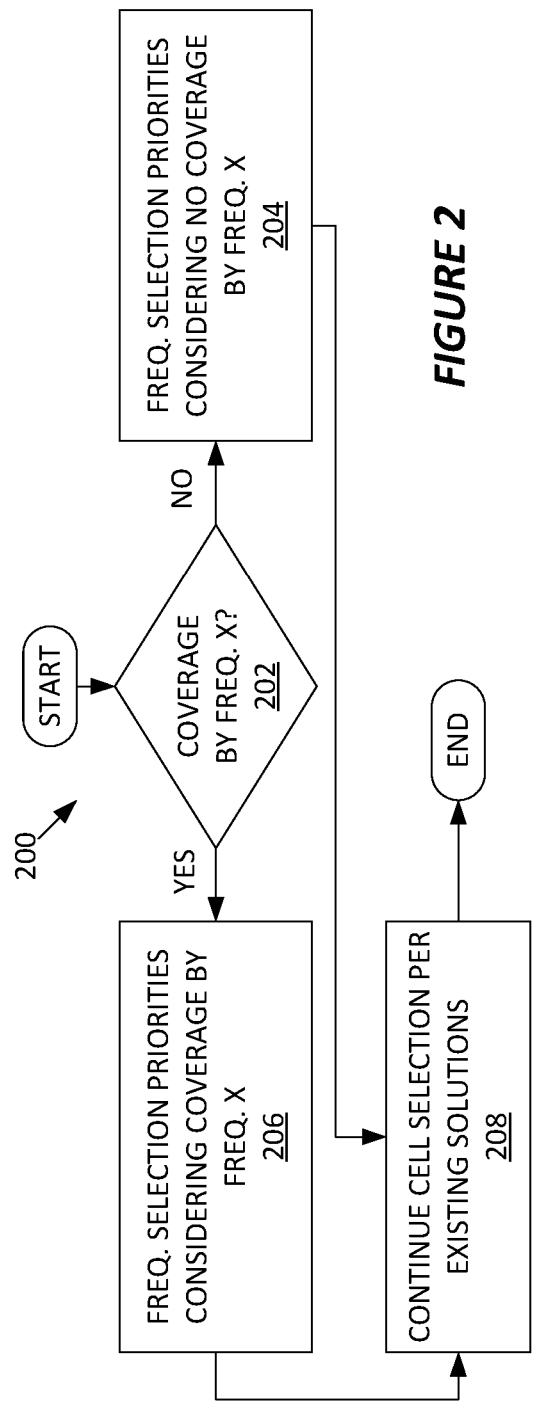

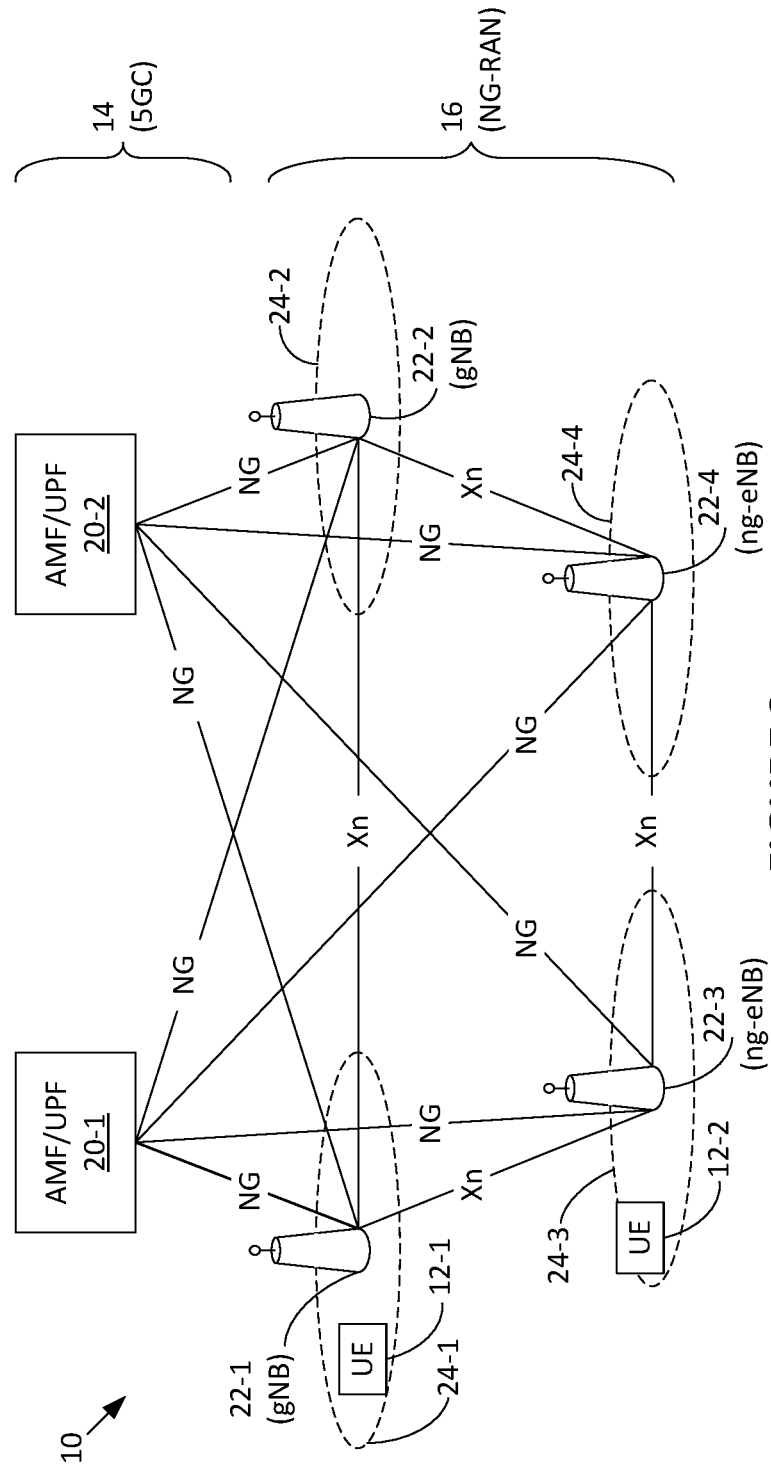
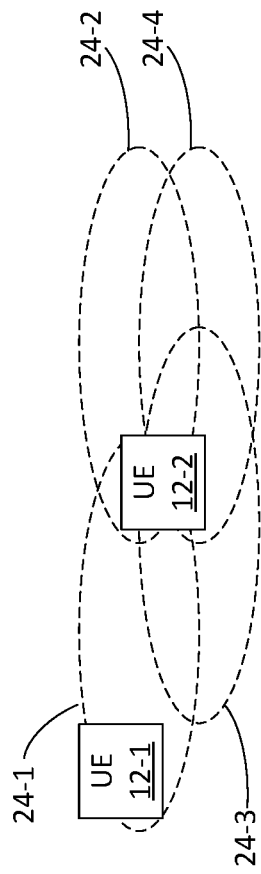
FIGURE 3
FIGURE 4

METHOD AND APPARATUS FOR CELL SELECTION IN A WIRELESS COMMUNICATION NETWORK

TECHNICAL FIELD

The present invention relates to cell selection operations in the context of wireless communication networks.

BACKGROUND

A User Equipment (UE) in a "dormant" state is not engaged in active radio communication with the involved wireless communication network. Correspondingly, the network may drop or suspend protocol connections used for radio connectivity with the UE, such as the Radio Resource Control (RRC) protocol. A dormant-mode UE performs certain procedures, such as cell selection or reselection, where the UE selects a "cell" of the network on which to "camp". "Camping" on the selected cell means that the UE monitors control signaling transmitted for the cell, e.g., for paging messages. When paged or when the UE has data to send or another need for connecting to the network, the UE initiates the connection in the cell on which it is camping.

The UE makes its camping-cell selections based on comparing signal measurements among the cells that it detects, at least for cells that are "acceptable" according to certain defined conditions. Camping-cell selection by the UE may also be driven by defined priorities. Conventional approaches to prioritizing cell reselection by the UE include prioritizing a certain frequency of radio carrier signal or prioritizing a certain Radio Access Technology (RAT). Known approaches to providing frequency and RAT priorities include indicating general priorities in "System Information" (SI) broadcasted by individual cells and providing dedicated signaling indicating specific priorities to a UE, such as might be done as the UE is released from the RRC connected state to one of the dormant states.

Example RRC protocol details in the context of networks operating according to the Long Term Evolution (LTE) specifications appear in the Third Generation Partnership Project (3GPP) Technical Specification (TS) 36.331 V15.7.0. Example RRC protocol details in the context of networks operating according to the Fifth Generation New Radio (5G NR) specifications appear in 3GPP TS 38.331 V15.7.0.

Examples of the "dormant state" include the LTE/NR IDLE, LTE IDLE with suspended, and LTE/NR INACTIVE states, also referred to as modes. Here, "LTE" denotes "Long Term Evolution" and "NR" denotes the "New Radio" component of the Fifth Generation (5G) wireless communication networks standardized by the 3GPP. See 3GPP TS 36.304 V15.2.0 for example idle-mode procedures undertaken by a UE in the LTE context and see 3GPP TS 38.304 V15.2.0 for example idle-mode and RRC inactive-state procedures undertaken by a UE in the NR context.

In more detail, Section 5 of 3GPP TS 38.304 provides good example details of dormant-state procedures undertaken by a UE for camping-cell selection or reselection. A UE scans radiofrequency (RF) channels in the applicable frequency bands to find available wireless communication networks, referred to as Public Land Mobile Networks or PLMNs. Upon selecting a PLMN, the UE attempts to find a suitable cell of the PLMN by performing measurements on cell-specific signals, such as cell reference signals or cell synchronization signals. See 3GPP TS 38.133 V15.6.0 for specific examples of cell-signal measurements and signal evaluations performed by a UE in the NR context. Operations may be adjusted in dependence on whether the involved cells use beamforming—i.e., a beamforming cell uses multiple directional radio beams, each covering corresponding portions of the overall geographic coverage area associated with the cell.

Upon finding a suitable cell belonging to the selected PLMN, the UE camps on that cell and is regarded as being "camped normally". Once normally camped, changing signal conditions may trigger the UE to select another cell for camping. If the UE does not find a suitable cell belonging to the selected PLMN, it looks for any cell that is acceptable for camping—e.g., one that is not barred, meets minimum signal-measurement thresholds, etc. A UE camping on a cell as a consequence of these procedures may be referred to being "camped on any cell", to differentiate from the "camped normally" scenario.

In the above context, the UE is essentially any type of wireless communication apparatus that is configured to use the PLMN(s) in question, which are more generally referred to as wireless communication networks. The more generic term "wireless communication device" is interchangeable with the term "UE". Further, the term "cell" broadly refers to specific radio service coverage in a specific geographic area, where the coverage may be associated with the use of directional radio beams. A radio access point of a wireless communication network may provide more than one cell, such as by using radio carrier signals having different carrier frequencies. In general, cells may be differentiated by any one or more of the involved geographic areas, which may be tailored using beamforming, the involved frequencies or times or both, and the involved radio access points or physical cell identifiers.

Regardless of the particulars used to define the cells in question, the conventional UE in a dormant state selects a cell of a wireless communication network as its camping cell, and monitors control-signaling transmitted in the cell for paging messages and further uses the camping cell for connecting or reconnecting to the network, in conjunction with exiting the dormant state. For example, when the network has data to transmit to the UE, it will typically page the UE in order to reach the UE, and, in response to the paging, the UE may then initiate the procedure to establish the connection.

Once the UE has an active connection additional resources can be setup, such as through additional cells, using multi-cell techniques like Dual Connectivity (DC) or Carrier Aggregation (CA). Multi-cell provides for increasing throughput between the network and the UE, distributing traffic in different cells, and handling or accounting for variations in radio link quality. See 3GPP TS 36.101 V16.2.0 for example carrier aggregation details in the LTE context. Further, regarding DC in the NR and multi-RAT context, see at least Section 4.5 of 3GPP TS 38.300 V15.3.1, and see the 3GPP Temporary Document (TDoc) identified as RP-182076 and submitted for consideration at the RAN #81 meeting of the 3GPP RAN Working Group 2.

Multi-RAT options depend on the roles played by the LTE RAT (E-UTRA) and the LTE core network (Evolved Packet Core or EPC) and played by the 5G RAT (NR) and the 5G core network (5GC). In an interworking context, NR radio access points or base stations generally are referred to as "gNBs" and E-UTRA radio access points or base stations are referred to as ng-eNBs, and various options exist for providing multi-RAT connectivity to a UE. See 3GPP TS 37.340 V15.8.0 for example details, including naming conventions for nodes in an interworking context. In an option referred to as "EN-DC", an LTE base station serves as the "master" node and an NR base station serves as a "secondary" node, with the backhaul connection going to the EPC. In an "NE-DC" option, an NR base station operates as the master node and an LTE base station operates as secondary node, and the backhaul connection goes to the 5GC. Other options include "NGEN-DC", with an LTE master node, an NR secondary node, and with 5GC used on the backhaul, and "NR-DC", where both the master and secondary nodes are NR and the 5GC is employed.

Broadly, a multi-cell configuration involves multiple connections (multi-connectivity) between the UE and the network using the same or different Radio Access Technologies (RATs) and may involve the same or different radio carrier signal frequencies. In at least one example of interest, a multi-cell configuration involves both LTE connections (radio links) and NR connections.

A key circumstance recognized herein is that conventional camping operations do not account for certain considerations related to multi-cell configurations. Consequently, a conventional UE makes camping-cell decisions—i.e., cell selection decisions for camping purposes-without accounting for multi-cell configurations that may be possible within or among the cells under consideration for camping-cell selection. As further recognized herein, the failure to account for multi-cell configurations in camping-cell selection may result in additional delays and increased signaling overhead in association with a UE connecting or reconnecting to a wireless communication network from a dormant state.

SUMMARY

An example wireless device in a dormant state improves its selection of a camping cell by accounting for multi-cell configurations. A multi-cell configuration provides advantages, such as improved throughput between a wireless communication network and the wireless device, based on the network serving the wireless device from two or more cells. By preferentially camping on a cell that belongs to a multi-cell configuration, the wireless device reduces the time and signaling needed to establish that multi-cell configuration, upon the wireless device connecting to the network via the camping cell. Accounting for the multi-cell configurations may be done jointly, along with accounting for conventional priorities, such as frequency or Radio Access Technology (RAT) priorities that are independent of multi-cell configurations and may be incorporated into the ranking of cells based on per-cell radio-signal measurements.

As one technique for accounting for multi-cell configurations, a wireless device determines cell-selection priorities for a plurality of cells that are candidates for selection by the wireless device as a camping cell, in dependence on combined levels of coverage provided by different combinations of cells, where each combination corresponds to a possible multi-cell configuration between the wireless device and the wireless communication network. Correspondingly, the device selects the camping cell from among the plurality of cells, in dependence on the cell-selection priorities. As one example, the "level of coverage" associated with a cell refers to a measured signal strength or quality determined by the device for cell, but further considerations, such as load balancing or throughput may be accounted for in the level of coverage.

Consider an example method performed by a wireless device, where the method includes evaluating received-signal measurements for individual cells among a plurality of cells of a wireless communication network, determining cell-selection rankings for the plurality of cells in dependence on the received-signal measurements and further in dependence on multi-cell configurations supported by the network for respective ones among the plurality of cells, and selecting one from among the plurality of cells as a selected cell for camping on by the wireless device, according to the cell-selection rankings. Cell-selection rankings may be based on ordering signal-measurements made for the respective cells, with applied measurement offsets or scaling according to the multi-cell configurations, possibly along with other prioritization information, such as prioritized frequencies or RATs.

The multi-cell configurations considered comprise, for example, the multi-cell configurations that are mutually supported by the network and by the device, and, from among those, the multi-cell configurations that are possible in view of the current coverage conditions. For example, a multi-cell configuration that is mutually supported is possible, in dependence on whether the device has coverage from each of the cells involved in the configuration. Here, the device "has coverage" from a cell, for example, to the extent that the device experiences at least some minimum received-signal quality or strength with respect to the cell. Whether or to what extent the device prefers one possible multi-cell configuration over another depends on, for example, the combined level of coverage estimated or expected for the involved combination of cells.

In another example, a wireless device performs a method for selecting a cell to camp on while the wireless device is in a dormant state. The method includes determining a level of coverage level provided to the wireless device by each cell among a plurality of cells and determining of a level of coverage provided to the wireless device by different combinations of cells among the plurality of cells. In one or more embodiments, the cell combinations considered by the device correspond to possible multi-cell configurations. The method further includes the wireless device selecting one of the cells to camp on, in dependence on the levels of coverage, such as by preferentially selecting one of the cells included in the combination of cells corresponding to a particular one of the possible multi-coverage configurations.

The level of coverage provided by a combination of cells may be referred to as a "combined level of coverage". As one example, the combined level of coverage provided by each combination of cells considered depends, for example, on the number of cells in the combination and the radio-signal qualities or strengths measured by the device for those cells. More generally, the coverage-level determinations can be understood as the wireless device determining where, in terms of which cell or cells, the wireless device will achieve the highest throughput.

As another example, a wireless device comprises processing circuitry and power supply circuitry that is configured for supplying power to the wireless device. The processing circuitry is configured to determine a level of coverage level provided to the wireless device by each cell among a plurality of cells and determine of a level of coverage provided to the wireless device by different combinations of cells among the plurality of cells. In one or more embodiments, the cell combinations considered by the device correspond to possible multi-cell configurations. The processing circuitry is further configured to select one of the cells for the wireless device to camp on, in dependence on the levels of coverage. For example, the processing circuitry preferentially selects one of the cells included in the combination of cells corresponding to a particular one of the possible multi-coverage configurations.

In another embodiment, a wireless device performs a method that includes determining a coverage level provided to the wireless device by each cell among a plurality of cells of a wireless communication network, and selecting one cell from among the plurality of cells as a camping cell, for camping on by the wireless device while the wireless device is in a dormant state. Here, the selecting accords with—accounts for—the provided coverage levels and one or more cell prioritizations corresponding to one or more multi-cell configurations. Each multi-cell configuration corresponds to serving the wireless device using a respective combination of cells from among the plurality of cells. The method further includes the wireless device camping on the selected cell.

In one or more particular embodiments, the wireless device performs a method wherein it applies cell-selection priorities on a conditional basis. The cell-selection priorities comprise, for example, certain carrier-frequency priorities that the wireless device applies for cell selection if at the time of evaluation, the wireless device has coverage by a certain carrier frequency. Here, saying that the device "has coverage" means, for example, that the device receives a reference signal or other cell-signal at the certain carrier frequency, with the received signal at or above a defined threshold of signal level or quality. The certain carrier frequency is associated with one or more multi-cell configurations, such that the UE can be understood as conditionally applying carrier-frequency priorities that account for or reflect a preference for camping on a cell that is included in a multi-cell configuration applicable to serving the device upon the device connecting or reconnecting to the network.

In a related embodiment, a wireless device comprises processing circuitry and power supply circuitry that is configured to supply power to the wireless device. The processing circuitry is configured to determine a coverage level provided to the wireless device by each cell among a plurality of cells of a wireless communication network, and select one cell from among the plurality of cells as a camping cell, for camping on by the wireless device while the wireless device is in a dormant state. Here, the selecting accords with—accounts for—the provided coverage levels and one or more cell prioritizations corresponding to one or more multi-cell configurations. Each multi-cell configuration corresponds to serving the UE using a respective combination of cells from among the plurality of cells. The processing circuitry is further configured to cause the wireless device to camp on the selected cell.

As another related embodiment, a non-transitory computer-readable medium stores a computer program comprising program instructions that, when executed by one or more processors of a wireless device, cause the wireless device to determine a coverage level provided to the wireless device by each cell among a plurality of cells of a wireless communication network, and select one cell from among the plurality of cells as a camping cell, for camping on by the wireless device while the wireless device is in a dormant state. Here, the selecting accords with—accounts for—the provided coverage levels and one or more cell prioritizations corresponding to one or more multi-cell configurations. Each multi-cell configuration corresponds to serving the UE using a respective combination of cells from among the plurality of cells. The computer program further includes program instructions that, upon execution, cause the wireless device to camp on the selected cell.

In another embodiment, a method of operation by a radio access node of a wireless communication network enables a wireless device to account for multi-cell configurations when prioritizing cells among a plurality of cells of the network, for camping-cell selection by the wireless device while operating in a dormant state. The method includes the radio access node generating priority information indicating one or more cell prioritizations corresponding to one or more multi-cell configurations, each multi-cell configuration corresponding to serving the wireless device using a respective combination of cells from among the plurality of cells. Further, the method includes transmitting the priority information, for reception by the wireless device.

In a related embodiment, a radio access node is configured for operation in a wireless communication network. The radio access node comprises power supply circuitry configured to supply power to the radio access node, which node also includes processing circuitry. The processing circuitry is configured to generate priority information indicating one or more cell prioritizations corresponding to one or more multi-cell configurations.

Each multi-cell configuration corresponds to serving a wireless device using a respective combination of cells from among a plurality of cells of the network. The processing circuitry is configured to transmit the priority information, for reception by the wireless device. The priority information enables the wireless device to account for multi-cell configurations when prioritizing cells among the plurality of cells for camping-cell selection by the wireless device while operating in a dormant state.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of an example coverage scenario involving three cells of a wireless communication network and to wireless devices.

FIG. 2 is a logic flow diagram of one embodiment of a method of operation by a wireless device, for camping-cell selection.

FIG. 3 is a block diagram of one embodiment of a wireless communication network.

FIG. 4 is a diagram of another example coverage scenarios, such as might be provided by the wireless communication network depicted in FIG. 3.

DETAILED DESCRIPTION

Figure 5:
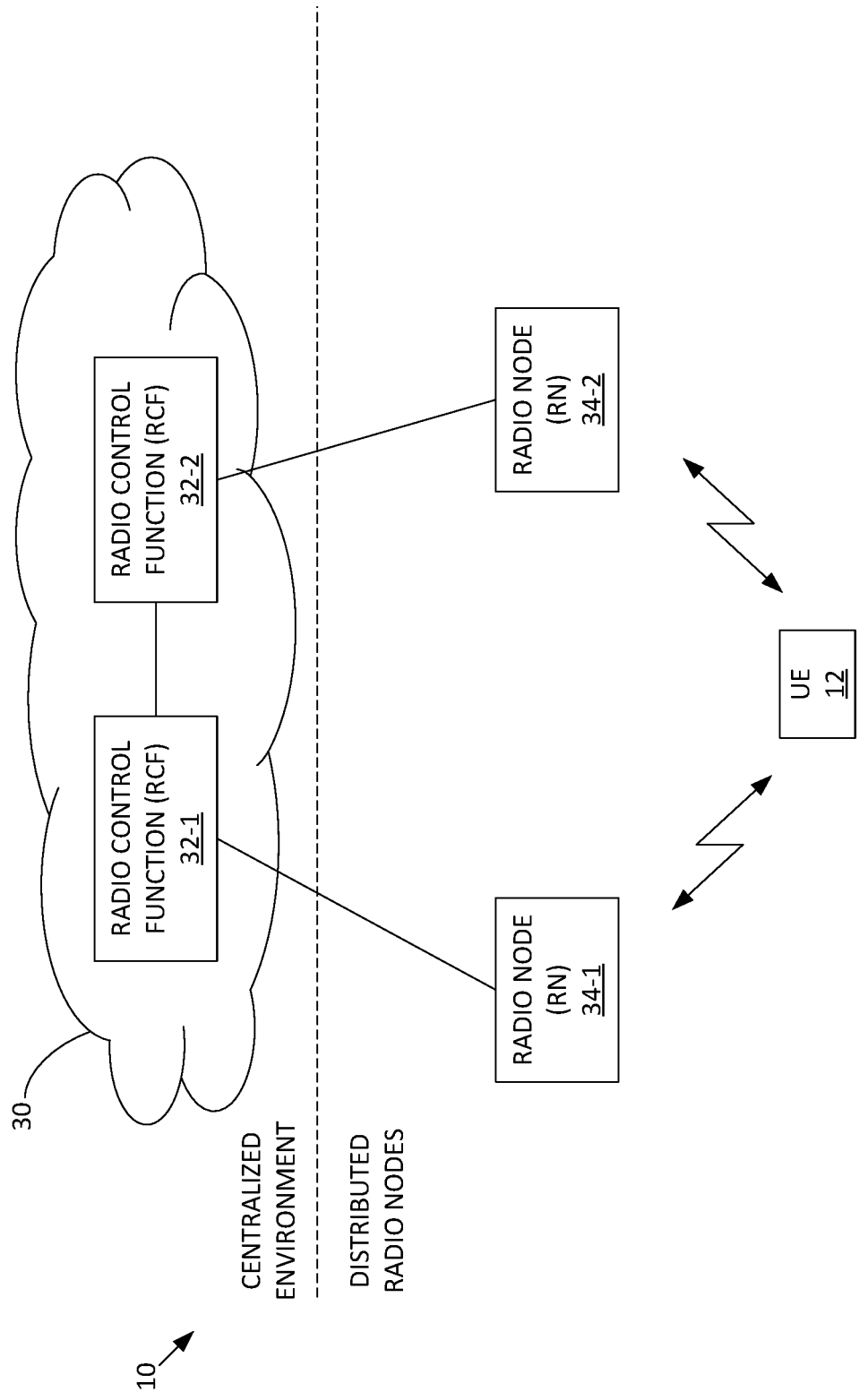
FIG. 5 is a block diagram of another embodiment of a wireless communication network, featuring an example arrangement of centralized processing resources and distributed radio nodes.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As noted in the "Background" section of this document, a User Equipment (UE) in a dormant state "camps" on a selected cell of a wireless communication network, and, while dormant, may change which cell is selected for camping. Here, "camping" means that the UE monitors control-signaling transmitted in the camping cell for paging messages, and the UE uses the camping cell to connect to the network, such as when the UE has data to send. "Connect" encompasses initial connections and reconnections.

According to contemplated techniques, the UE alters its camping-cell selection behavior to account for multi-cell configuration opportunities. The term "multi-cell configuration" refers to serving a connected UE via more than one connection, which may be understood as serving the UE from two or more cells, or, using the broader term "data conveyor," serving an active-state UE from two or more data conveyors. Dual Connectivity (DC) and Carrier Aggregation (CA) configurations are examples of multi-cell configurations.

Assuming that minimum signal-strengths or qualities are satisfied and that cell loadings are not excessive, serving a UE with two or more connections offers the opportunity for higher throughput than a single connection. Correspondingly, a UE according to one or more contemplated embodiments alters its camping-cell selection behavior according to at least a conditional preference corresponding to a multi-cell configuration. Behavioral changes advantageously reflect the recognition herein that camping on a cell associated with a multi-cell configuration simplifies and expedites establishment of that multi-cell configuration upon the UE transitioning from the dormant state to an active state.

Of course, certain multi-cell configurations may be preferred over others, meaning that the preference for camping on a cell associated with a multi-cell configuration—referred to as a "multi-cell cell" for convenience—may include not only selection biasing as between single-connectivity cells versus multi-cells, but also selection biasing as between one multi-cell configuration versus another multi-cell configuration, in dependence on the multi-cell configuration(s) respectively associated with each such cell. To be clear, the UE may camp on one cell, with the foregoing single-connectivity versus multi-cell connectivity referring to connection configurations possible for the UE upon connection/reconnection to the network.

Examples of multi-cell include carrier aggregation where two or more data conveyors serve the UE. Carrier aggregation may be used on the downlink or the uplink or both, and the downlink and uplink aggregations need not be symmetric. "Dual Connectivity" or DC refers to another variant of multi-cell, wherein two groups of data conveyors serve the UE, with one group of one or more data conveyors corresponding to a master cell group and the other group of one or more data conveyors corresponding to a secondary cell group.

A simple example according to one embodiment of a UE highlights general considerations for preferencing multi-cell cells in the context of a UE selecting a camping cell. First, the UE detects cells that are available for camping. The UE establishes a baseline ranking of the available cells from strongest or best to weakest or worst, based on the radio-signal measurements made by the UE for respective ones of the cells—i.e., ranking based on the respective coverage levels. The UE then applies offsets or scaling to the radio-signal measurements, to bias camping-cell selection by the UE towards one or more cells that are associated with one or more multi-cell configurations as compared to cells that are not associated with a multi-cell configuration. The biasing may favor a certain multi-cell configuration and the extent of the biasing for individual cells may depend on the desirability of the multi-cell configuration(s) that are associated with the individual cells.

A key point here is that the preferences may be explicitly or implicitly associated with multi-cell configurations. For example, the UE may know or receive first prioritization information that prioritizes one or more carrier frequencies or Radio Access Technologies (RATs), and, further, the UE may know or receive second or further prioritization information that supplements or supplants the first prioritization information, where the second prioritization information accounts for multi-cell configurations. As one example, a radio access point of the involved wireless communication network provides the additional prioritization information that sets frequency or cell priorities according to one or more multi-cell configurations and the UE may apply such priorities conditionally, for example in dependence on the frequencies or RATs that provide coverage to the UE in the current location of the UE.

In at least one embodiment, a UE, also referred to as a wireless device, applies an "alternative cell reselection priority setting" when in a dormant state, with reference to combinations of cells corresponding to possible multi-cell configurations. Each multi-cell configuration corresponds to serving the UE in an active or connected state, from two or more cells. For example, one or more of the multi-cell configurations correspond to a DC configuration involving two cells of the same or different RATs and having the same or different carrier-signal frequencies.

Here, the dormant state is, for example, an inactive or idle state, and may involve a suspended RRC connection. Because each cell is associated with any combination of RAT, carrier-signal frequency, beam, and bandwidth part within a larger system frequency, choosing a cell for camping may be understood as choosing a "data conveyor" associated with serving the UE in an active or connected state. The data conveyor may be used for any signaling between a UE and a network (for example, a base station), including user plane signaling, control plane signaling, other control signaling (such as MAC control elements and DCI), and so on.

The coverage level provided to the UE by each of the cells under consideration for camping-cell selection may be determined based on radio-signal measurements made by the UE for the cell, e.g., measurements made on a cell reference signal, a cell synchronization signal, or some other signal transmitted in the cell that may be used by the UE to gauge channel quality with respect to the cell. The UE may use a threshold value, where the threshold value may relate to a quality of the signal and the threshold(s) may be configured through dedicated or broadcasted signaling or may be hard-coded. If the coverage level provided to the UE by a certain cell satisfies the threshold, the UE may be said to have "coverage" by or from that cell.

Unless otherwise stated, the methods for selecting a camping cell to camp on may be performed while the UE is in a dormant state, or while the UE is not in a dormant state. For example, while the UE does not camp while active, the UE may make a camping cell decision while it is active, or may at least determine the camping cell preferences to be used for altering its camping-cell selection behavior, once the UE transitions to a dormant state and performs a camping-cell selection procedure.

Typically, the UE camps on a single cell while in a dormant state. It is possible for the UE to camp on plural cells while in a dormant state, however this requires the UE to monitor paging from the plural cells, which can result in an increase in the UE power consumption relative to single-cell camping. Multi-cell camping may, therefore, be undesirable at least for certain kinds of battery-powered UEs.

FIG. 1 depicts an example scenario. A first UE, UE1, has coverage from three cells, Cell A, Cell B, and Cell C. A second UE, UE2, has coverage from only Cell B and Cell C. Here, saying that a UE "has coverage" from a cell means that received-signal measurements by the UE with respect to the cell meet minimum thresholds. Camping-cell selection by the respective UEs may be done so that UE1, which has coverage of Cell A shall camp on Cell C and UE2, which does not have coverage of Cell A shall camp on Cell B. In this way, improved UE throughput may be facilitated. As is illustrated by this example, the combination (or selection) of cells which is calculated to provide a good level of coverage for active-mode operation may be a cell or may be a combination of cells. For example, UE2 camping on Cell B may reflect an expectation of remaining on only Cell B if UE2 transitions to an active state while camping on Cell B. UE1 camping on Cell A or C may reflect an expectation of a multi-cell configuration with Cells A and C if UE1 transitions to an active state while camping on Cell A or C.

The exact preferences by which a UE selects a most-preferred cell among the cells available for camping selection may vary. For example, the UE can have different priorities depending on the prevailing coverage experienced by the UE, in terms of which cells and frequencies are available. FIG. 2 depicts a flowchart illustrating an example modification of an existing cell reselection algorithm to incorporate considerations of coverage in another frequency layer. Here, "coverage in another frequency layer" means the possibility of multi-cell involving the other frequency layer. The method 200 includes determining (Block 202) whether the UE has coverage by frequency X. If not (NO from block 202), the UE sets frequency selection priorities in consideration of no coverage by frequency X (Block 204) and continues cell selection per conventional or existing solutions (Block 208). If so (YES from Block 202), the UE sets frequency selection priorities in consideration of coverage by frequency X (Block 206). Here, "frequency X" is, for example, a frequency associated with one or more possible multi-cell configurations, which means prioritizing camping-cell selection towards a cell having frequency X corresponds to prioritizing the multi-cell configurations associated with coverage by frequency X.

Controlling how or whether a UE accounts for multi-cell configurations in its dormant-state cell selection operations involves, in at least one embodiment, the wireless communication network providing the UE with specific instructions, such as when a radio access point, also referred to as a "base station", releases the UE to the dormant state. In another embodiment, the UE independently has the freedom to take camping-cell decisions in consideration of multi-cell options, based on internal logic. Additionally, or alternatively, information used by the UE to incorporate multi-cell possibilities into its cell-selection decisions for camping-cell selection come to the UE by way of the core network or an operations and maintenance node of the wireless communications network.

In at least one embodiment, the selection of a camping cell by a UE may be combined with configuration of early measurements that the UE performs when dormant, for example, when entering the dormant state, which may be a defined idle or inactive state. The UE may, using early measurements, be configured to perform measurements on additional cells and use those measurement results to determine where to camp. The additional measurements are reused for early measurement to the network when the UE connects. The measurements on additional cells can then include such that are in the same RAT as the cell where the UE is currently camping or evaluating for cell selection or be from a different RAT.

Accounting for multi-cell possibilities in camping-cell selection in one or more embodiments may be broadly understood as the UE evaluating the combined levels of coverage afforded by one or more combinations of cells that are candidates for camping selection by the UE, where each such combination of cells corresponds to a multi-cell configuration that is possible for the UE. In this manner, the UE goes beyond or deviates from selecting a best or most preferred cell according to ranked radio-signal measurements and conventional frequency or RAT prioritizations, and considers which cell is most preferred in consideration of the multi-cell configurations that are possible for the UE upon connecting or reconnecting to the network from the camping cell.

Accounting for the multi-cell configurations, either explicitly or implicitly, may be termed an "alternative cell reselection priority setting". In at least one embodiment, the alternative cell reselection priority setting is valid during the duration of time for the early measurement configuration, i.e., as long as the UE is performing early measurements while dormant, for enabling quick setup of multi-cell (CA or DC) when the UE enters the connected mode. The duration of time in which the "alternative cell reselection priority setting" is valid may correspond to the configured duration time for the early measurements (e.g. the duration of idle mode measurements provided through the measIdleDuration-r15 in the RRCConnectionRelease message in the 3GPP technical specifications broadly referred to as LTE Rel-15. Other similar duration configurations may be adopted. The validity time may also include the time that the UE decides to perform such early measurements, for example, in the case where the UE determines to continue the measurements after the end of the duration that has been configured by the network.

The UE may also use the "alternative cell reselection priority setting" during the duration time for the early measurement configuration, independent of whether or not the UE determines that it has coverage of a specific additional cell. The UE may be configured to perform early measurements for fast setup of multi-cell in anticipation of later entry by the UE into a connected state, for a configured duration of time. For example, the network indicates the configured time to the UE using the measIdleDuration-r15 in the RRCConnectionRelease message defined in LTE Rel-15 or using a similar mechanism for configuring the duration during which the UE uses the alternative cell reselection priority. During that duration, the UE may also be configured to apply the alternative cell reselection priority setting even if it does not determine that it has coverage in another cell. When the duration of the early measurements has ended and the UE is still in a dormant, state, the UE may then instead use the "normal cell reselection priority setting".

As an example, the normal cell reselection priority accounts for conventional prioritization of cells by frequency or RAT, and the UE obtains the normal priorities, for example, by receiving them via dedicated signaling or broadcasted (general) signaling. In a dedicated signaling example, the network uses an RRCConnectionRelease or RRCRelease message to indicate the information to the UE. In a general-signaling example, the UE receives the information in information elements included in System Information (SI) broadcasted by the network in the cell currently selected by the UE. The time period that the UE applies the alternative cell reselection priority setting can also correspond to the whole time period that the UE performs the early measurements. For example, the UE may decide to continue those measurements even after the end of the duration that has been configured by the network.

The ranking criterion of cells used for cell re-selection in a dormant state such as RRC IDLE and RRC_INACTIVE may be extended to include an offset if a frequency used only as a Secondary Cell (SCell) or a Primary Secondary Cell (PSCell) together with the cell evaluated for reselection in a DC or CA configuration fulfills a condition. Sufficiently good signal quality for the SCell or PSCell stands as an example condition. Otherwise, an offset is not applied to the cell evaluated for reselection.

Introducing a new offset to cell rankings Rn accounts for multi-cell configurations, such as may be realized with respect to deciding whether to stayed camped on a current cell, referred to as a "serving" cell or select one of the available neighboring cells. In an example configuration, the UE uses the following logic: a neighbor cell should be selected if a specific other neighbor cell is sufficiently good, or the serving cell should be selected if a specific neighbor cell is sufficiently good. These conditional evaluations at least implicitly consider the multi-cell configurations possible with respect to the serving cell and one or more neighboring cells, or possible with respect to a neighboring cell and one or more other neighboring cells. Implementation of the logic may be as follows:

$$Rs = Qmeas,s + Qhyst - Qoffsettemp + Qoffsets,n\_bis$$

$$Rn = Qmeas,n - Qoffset - Qoffsettemp + Qoffsetn,n\_bis,$$

where Qoffsets,n_bis (serving associated with neighbor2) is equal to Qoffset,n_bis if Qmeas,n_bis is larger than threshold, and Qoffsetn_bis is valid, otherwise this is equal to zero, and Qoffsetn,n_bis (neighbor is associated with neighbor2) is equal to Qoffset,n_bis if Qmeas,n_bis is larger than threshold and Qoffset,n_bis is valid, otherwise is equal to zero. The logic means that if the "other cell" (n_bis) is associated with the serving cell in terms of a multi-cell configuration possibility, the offset is added to the rank of the serving cell, and similarly if the "other cell" (n_bis) is associated with a particular neighboring cell in terms of a multi-cell configuration possibility, the offset is added to that neighboring cell.

An example of signaling the offset information involves the use of the "System Information Block Type 3" or SIB3, such as used in networks based on LTE or NR. An example SIB3 Information Element (IE) is as follows:

```
-- ASN1START
-- TAG-SIB3-START
SIB3 ::=                        SEQUENCE {
    intraFreqNeighCellList          IntraFreqNeighCellList      OPTIONAL, -- Need R
    intraFreqBlackCellList          IntraFreqBlackCellList      OPTIONAL, -- Need R
    lateNonCriticalExtension        OCTET STRING                OPTIONAL,
    ...,
    [[
    cellPairConditionList           NeighPairList               OPTIONAL, -- Need R
    ]]
}
IntraFreqNeighCellList ::=      SEQUENCE (SIZE (1..maxCellIntra)) OF
IntraFreqNeighCellInfo
IntraFreqNeighCellInfo ::=      SEQUENCE {
    physCellId                      PhysCellId,
    q-OffsetCell                    Q-OffsetRange,
    q-RxLevMinOffsetCell                INTEGER (1..8)          OPTIONAL, -- Need R
    q-RxLevMinOffsetCellSUL             INTEGER (1..8)          OPTIONAL, -- Need R
    q-QualMinOffsetCell                 INTEGER (1..8)          OPTIONAL, -- Need R
    ...,
    [[
```

```
    neighCellPairConditionList         NeighPairList          OPTIONAL -- Need R
    ]]
}
IntraFreqBlackCellList ::=    SEQUENCE (SIZE (1..maxCellBlack)) OF PCI-Range
NeighPairList ::=             SEQUENCE (SIZE (1..maxCellIntra)) OF NeighPair
NeighPair ::= SEQUENCE {
    frequency                                            ARFCN,
    secondaryPhysCellId       PhysCellId,
    threshold                 ReselectionThreshold,
    q-OffsetCellPair          Q-OffsetRange,
}
-- TAG-SIB3-STOP
-- ASN1STOP
```

If the cellPairConditionList is configured in SIB3, the serving cell is associated with a neighbor cell to be used for multi-cell, e.g., carrier aggregation or dual connectivity.

If the neighCellPairConditionList is configured for a neighboring cell inside the IntraFreqNeighCellInfo, that neighbor cell is associated with the same or another neighbor cell to be used for carrier aggregation or dual connectivity.

The configurations for the reselection criteria may contain, for example:

Frequency of the secondary cell
Physical cell ID of the secondary cell
A threshold for when to consider the secondary cell to be sufficiently good
Multiple thresholds could be applied, e.g. based on RSRP and/or RSRQ and whether the neighboring cell is higher or lower ranked than the serving cell.
An offset to be applied to the ranking of the cell As an example involving a given configuration of three cells A, B, and C, where cell A can only be used as an SCell if B is the Primary Cell (PCell). Cell B should be selected by the UE if both cell A and B are available to it for camping-cell selection, and cell C should be selected if A is not available.

If the UE selects cell B, it will read SIB3 as read:

```
-- ASN1START
-- TAG-SIB3-START
SIB3 ::=                              SEQUENCE{
    intraFreqNeighCellList            IntraFreqNeighCellList  OPTIONAL, -- Need R
    intraFreqBlackCellList            IntraFreqBlackCellLits  OPTIONAL, -- Need R
    lateNonCriticalExtension          OCTET STRING            OPTIONAL,
    ...,
    [[
    cellPairConditionList             NeighPairList           OPTIONAL, -- Need R
    ]]
}
IntraFreqNeighCellList ::=            SEQUENCE (SIZE (1..maxCellIntra)) OF
IntraFreqNeighCellInfo
IntraFreqNeighCellInfo ::=            SEQUENCE {
    physCellId                        PhysCellId,
    q-OffsetCell                      Q-OffsetRange,
    q-RxLevMinOffsetCell              INTEGER (1..8)          OPTIONAL, -- Need R
    q-RxLevMinOffsetCellSUL           INTEGER (1..8)          OPTIONAL, -- Need R
    q-QualMinOffsetCell               INTEGER (1..8)          OPTIONAL, -- Need R
    ...,
    [[
    neighCellPairConditionList        NeighPairList           OPTIONAL -- Need R
    ]]
}
IntraFreqBlackCellList ::=            SEQUENCE (SIZE (1..maxCellBlack)) OF PCI-Range
NeighPairList ::=                     SEQUENCE (SIZE (1..maxCellIntra)) OF NeighPair
NeighPair ::= SEQUENCE {
    Frequency                                                 ARFCN,
        secondary PhysCellId          PhysCellId,
    threshold ReselectionThreshold,
    q-OffsetCellPair                  Q-OffsetRange,
}
-- TAG-SIB3-STOP
-- ASN1STOP
```

The element intraFreqNeighCellList would contain only the physical cell ID (PCI) of cell C, and corresponding re-selection criteria, and cellPairCondition will contain only one entry with the frequency, PCI, threshold and Quality Offset (Q-Offset) of cell A. Here, the quality values used as the base criteria for ranking the respective cells come from radio-signal measurements made by the UE with respect to reference signals or other signals transmitted in the respective cells.

The UE would then consider the ranking of cell B (RB) and the ranking of cell C (RC) as follows:

$RB = Qmeas,B + Qhyst - Qoffsettemp + Qoffset_{B,A}$ $RC = Qmeas,C - Qoffset - Qoffsettemp$ Where QoffsetB,A=q−OffsetCellPair if Qmeas, A>threshold; else QoffsetB,A=0

If RC>RB, the UE reselects to cell C, otherwise it continues to camp on cell B.

Similarly, if the UE is camping on cell C, it will read SIB3 from cell C, where it will receive:

```
-- ASN1START
-- TAG-SIB3-START
SIB3 ::=                           SEQUENCE {
    intraFreqNeighCellList             IntraFreqNeighCellList      OPTIONAL, -- Need R
    intraFreqBlackCellList             IntraFreqBlackCellList      OPTIONAL, -- Need R
    lateNonCriticalExtension           OCTET STRING                OPTIONAL,
    ...,
    [[
    cellPairConditionList              NeighPairList               OPTIONAL, -- Need R
    ]]
}
IntraFreqNeighCellList ::=         SEQUENCE (SIZE (1..maxCellIntra)) OF
IntraFreqNeighCellInfo
IntraFreqNeighCellInfo ::=         SEQUENCE {
    physCellId                         PhysCellId,
    q-OffsetCell                       Q-OffsetRange,
    q-RxLevMinOffsetCell                  INTEGER (1..8)           OPTIONAL, -- Need R
    q-RxLevMinOffsetCellSUL               INTEGER (1..8)           OPTIONAL, -- Need R
    q-QualMinOffsetCell                   INTEGER (1..8)           OPTIONAL, -- Need R
    ...,
    [[
    neighCellPairConditionList         NeighPairList               OPTIONAL -- Need R
    ]]
}
IntraFreqBlackCellList ::=         SEQUENCE (SIZE (1..maxCellBlack)) OF PCI-Range
NeighPairList ::=                  SEQUENCE (SIZE (1..maxCellIntra)) OF NeighPair
NeighPair ::= SEQUENCE {
    Frequency                                                      ARFCN,
    secondary PhysCellId               PhysCellId,
    threshold                          ReselectionThreshold,
    q-OffsetCellPair                   Q-OffsetRange,
}
-- TAG-SIB3-STOP
-- ASN1STOP
```

Since there is no SCell associated with cell C, the list cellPairConditionList is not included. Instead, the IntraFreqNeighCellList contain an entry for cell B in IntraFreqNeighCellInfo comprising the PCI of cell B and the reselection criteria. In addition, the IntraFreqNeighCellInfo also contains a neighCellPairConditionList which contain the PCI, threshold and Q-Offset of cell A.

The UE would then consider the ranking of cell B (RB) and the ranking of cell C (RB) as follows:

$RC = Qmeas,C + Qhyst − Qoffsettemp$ $RB = Qmeas,B − Qoffset − Qoffsettemp + QoffsetB,A$ Where QoffsetB,A=q-OffsetCellPair if Qmeas, A>threshold; else QoffsetB,A=0

If RB>RC, the UE reselects to cell B, otherwise it continues to camp on cell C.

The above examples relate to a configuration using intra-frequency neighbors, i.e., cell B and cell C are on the same frequency. However, similar extension can be made to other SIBs, for example SIB4 and SIB5, for applicability to inter-frequency and inter-RAT neighbors where cell B and cell C are on different frequencies. Also, for SIB3, inter-RAT neighbors can be configured for a neighbor pair of cells.

In addition, there could be multiple cell pairs accounted for in the rankings. For example, cell B can add cell A as an SCell, and cell D can add cell E as an SCell, and these combinations would be added as separate entries in the neighCellPairConditionList.

Thus, in at least some embodiments or in at least some circumstances, one cell can be associated with multiple secondary cells, so that if any of the secondary neighbor cells are sufficiently good, the UE shall prioritize that neighbor cell. In this case, for example it can be a relative ranking between the different pair of cells. In an example of this a configuration may include four different cells, A, B, C, and D. In this configuration Cell A can add either cell B or cell C as an SCell. Thus, if either of cell B or cell C is available, the UE should prioritize cell A, given that it provides multi-cell possibilities with respect to each of cells B and C. If neither cell B, nor C is above a threshold, the UE should select cell D.

In this case, the cellPairConditionList and neighCellPairConditionList could contain multiple entries for cell B and C and the reselection criteria could be changed to, for example: if the UE is camping on cell A:

$RA = Qmeas,A + Qhyst − Qoffsettemp + Qoffsets,nbis$, $RD = Qmeas,D − Qoffset − Qoffsettemp$, where Qoffsets, nbis=q-OffsetCellPair if Qmeas, B>threshold_B or if Qmeas, C>threshold_C; else Qoffsetn,nbis=0.

Alternatively, if the UE is camping on cell D:

$RD = Qmeas,D + Qhyst − Qoffsettemp$, $RA = Qmeas,A − Qoffset − Qoffsettemp + Qoffsetn,nbis$, where Qoffsetn,nbis=q-OffsetCellPair if Qmeas, B>threshold_B or if Qmeas, C>threshold_C; else Qoffsetn,nbis=0.

In at least one embodiment, the UE is provided with conditional cell re-selection priorities that consider the capability of the UE and the associated subscription with respect to multi-cell possibilities, and the capability of the network with respect to supporting multi-cell among the involved cells. Put another way, the multi-cell possibilities applicable to a particular set or group of cells that are subject to selection consideration by the UE for camping in the dormant state depend on the multi-cell configurations that are mutually supported by the network and the UE with respect to those cells, including consideration of the involved frequencies and RATs.

One recognition attending the consideration of multi-cell possibilities when making camping-cell selections is that the definition of different cell selection priorities depend on whether the UE is in the coverage of another frequency layer or RAT—i.e., whether the UE enjoys sufficiently good signal strength quality with respect to another frequency or RAT. An example on how this dependence can be specified in RRC is shown below, where the changes relative to an existing RRCRelease message are highlighted using bolded, underlined text:

RRCRelease Message

```
-- ASN1 START
-- TAG-RRCRELEASE-START
RRCRelease ::=                          SEQUENCE{
    rrc-TransactionIdentifier               RRC-TransactionIdentifier,
    criticalExtensions                      CHOICE {
        rrcRelease                              RRCRelease-IEs,
        criticalExtensionsFuture                    SEQUENCE { }
    }
}
RRCRelease-IEs ::=                      SEQUENCE {
    redirectedCarrierInfo                   RedirectedCarrierInfo       OPTIONAL, -- Need N
    cellReselectionPriorities               CellReselectionPriorities   OPTIONAL, -- Need R
    suspendConfig                           SuspendConfig               OPTIONAL, -- Need R
    deprioritisationReq                     SEQUENCE {
        deprioritisationType                    ENUMERATED {frequency, nr},
        deprioritisationTimer                   ENUMERATED {min5, min10, min15, min30}
    } OPTIONAL, -- Need N
    lateNonCriticalExtension                OCTET STRING                OPTIONAL,
    nonCriticalExtension                    RRCRelease-v1540-IEs        OPTIONAL
}
RRCRelease-v1540-IEs ::=                SEQUENCE {
    waitTime                            RejectWaitTime                  OPTIONAL, -- Need N
    nonCriticalExtension                RRCRlease-v16xy-IEs                    OPTIONAL
}
RedirectedCarrierInfo ::=               CHOICE {
    nr                                  CarrierInfoNR,
    eutra                               RedirectedCarrierInfo-EUTRA,
    ...
}
RedirectedCarrierInfo-EUTRA ::=                 SEQUENCE {
    eutraFrequency                          ARFCN-ValueEUTRA,
    cnType-r15                              ENUMERATED {epc,fiveGC}
OPTIONAL -- Need N
}
CarrierInfoNR ::=                       SEQUENCE {
    carrierFreq                         ARFCN-ValueNR,
    ssbSubcarrierSpacing                    SubcarrierSpacing,
    smtc                                SSB-MTC OPTIONAL, -- Need S
    ...
}
CellReselectionPriorities ::=           SEQUENCE {
    freqPriority ListEUTRA                  FreqPriorityListEUTRA OPTIONAL, -- Need M
    freqPriorityListNR                      FreqPriorityListNR          OPTIONAL, -- Need M
    t320                                ENUMERATED {min5, min10, min20, min30, min60,
min120, min180, spare1} OPTIONAL, -- Need R
    ...
}
FreqPriorityListEUTRA ::=               SEQUENCE (SIZE (1..maxFreq)) OF FreqPriorityEUTRA
FreqPriorityListNR ::=                  SEQUENCE (SIZE (1..maxFreq)) OF FreqPriorityNR
FreqPriorityEUTRA ::=                   SEQUENCE {
    carrierFreq                         ARFCN-ValueEUTRA,
    cellReselectionPriority                 CellReselectionPriority,
    cellReselectionSubPriority                  CellReselectionSubPriority  OPTIONAL -- Need R
}
FreqPriorityNR ::=                      SEQUENCE {
    carrierFreq                         ARFCN-ValueNR,
    cellReselectionPriority                 CellReselectionPriority,
    cellReselectionSubPriority                  CellReselectionSubPriority  OPTIONAL -- Need R
}
CellReselectionPriority ::=             INTEGER (0..7)
CellReselectionSubPriority ::=              ENUMERATED       {oDot2, oDot4, oDot6, oDot8}
**RRCRelease-v16xy-IEs::=**                **SEQUENCE {**
    conditionalCellReselectionPriorityList-r16
ConditionalCellReselectionPriorityList-r16
```

-continued

```
    nonCriticalExtension              SEQUENCE { }         OPTIONAL
}
ConditionalCellReselectionPriorityList-r16 :: = SEQUENCE (SIZE (1..maxFreq))
OF ConditionalCellReselectionPriority-r16
    ConditionalCellReselectionPriorityList-r16:: SEQUENCE {
      condFreq   :: =      CHOICE {
            carrierFreqCoverageEUTRA                    ARFCN-
ValueEUTRA,
            carrierFreqCoverageNR                ARFCN-ValueNR
      }
        coverage         ENUMERATED {true}           OPTIONAL,
        freqPriorityListEUTRA           FreqPriorityListEUTRA   OPTIONAL,
-- Need M
      freqPriorityListNR         FreqPriorityListNR        OPTIONAL, -- Need M
      t320          ENUMERATED {min5, min10, min20, min30, min60,
min120, min180, spare1}   OPTIONAL,      -- Need R
      ...
}
```

The conditionalCellReselectionPriorirtyList introduces cell selection priorities that are based on whether the UE is in coverage of other cells or frequencies.

For example, if it is desired to introduce conditional cell selection criteria like:
  if UE is in the coverage of an EUTRA cell of freq X, prioritize the NR frequencies in the order of a, b, c;
  if UE is not in the coverage of an EUTRA cell of freq X, prioritize the NR frequencies in the order of b, a, c.

In one example, the conditional cell reselection priorities list may be filled as:
  first entry:

```
    carrierFreqCoverageEUTRA = X
    coverage= true
    freqPriorityListNR = { {a, p1}, {b,p2}, {c, p3}}
}
``` second entry:

```
    carrierFreqCoverageEUTRA = X
    coverage= false (i.e. value not included)
    freqPriorityListNR = { {b, p1}, {a,p2}, {c, p3}}
}
```

Here, p1 is the highest cell selection priority and p3 is the lowest. The above structure facilitates DC setup between the UE and the network upon the UE entering connected mode via its camping cell.

An example of a configuration for facilitating CA setup is shown below:
  if UE is in the coverage of an NR cell of freq Y, prioritize the NR frequencies in the order of a, b, c;
  if UE is not in the coverage of an NR cell of freq Y, prioritize the NR frequencies in the order of b, a, c.

The conditional cell reselection priorities list may be filled as:
  first entry:

```
    carrierFreqCoverageNR = Y
    coverage= true
    freqPriorityListNR = { {a, p1}, {b,p2}, {c, p3}}
}
``` second entry:

```
    carrierFreqCoverageNR = Y
    coverage= false (i.e. value not included)
    freqPriorityListNR = { {b, p1}, {a,p2}, {c, p3}}
}
```

A similar structure can be introduced in SIB2, SIB4 and SIB5, to contain the cell reselection priorities. Alternatively, the priority information appears in another IE, or even in another broadcasted message.

In an example scenario, a UE is in the coverage of freq X and freq Y at the same time, and there is a conditional cell reselection priority associated with both these frequencies. The UE may then check which of these frequencies has the highest (non-conditional) priority via the legacy (conventional) cell resection priority configuration and apply the conditional cell reselection priority associated with that frequency.

Consider a UE configured to use or account for conditional priorities in a manner consistent with the details immediately above. The UE receives priority information indicating one or more frequency priorities to apply in cell reselection by the UE, and further indicating a coverage condition that must be satisfied in order for the indicated frequency priorities to apply. The condition is, for example, that the UE must experience at least a minimum level of coverage in a specified frequency. Thus, when performing a cell reselection, the UE does or does not apply the conditional frequency priorities, in dependence on whether the correspondingly specified condition is satisfied.

Such an approach allows, among other things, for the UE to be configured with conventional frequency-selection priorities and conditional frequency-selection priorities, where the conditional frequency-selection priorities reflect or account for multi-cell configurations. For example, a particular frequency may be associated with one or more multi-cell configurations such that the UE experiencing a sufficient level of coverage in that frequency triggers the UE to apply conditional frequency-selection priorities reflective of one or more of those multi-cell configurations. That is, the UE conditionally biases its cell selection operations in dependence on whether it has coverage by a specified frequency or frequencies, where the specified frequency or frequencies correspond to one or more multi-cell configurations.

Multiple possibilities exist regarding the mechanism by which a UE determines whether it is in the coverage of a certain frequency. For example, threshold values, such as signal quality threshold values, are broadcasted in a SIB and specify the lowest signal quality that a particular frequency or RAT should have for the UE to consider itself as being in the coverage of that frequency or RAT. The threshold value can be the same for all RATs/frequencies, or a separate value can be configured for each RAT/frequency, or some RATs and/or frequencies can share a threshold value. For each cell being evaluated, the UE determines signal quality, for example, in terms of Reference Signal Received Power (RSRP), Reference Signal Received Quality (RSRQ), Received Signal Strength Indicator (RSSI), Signal to Interference plus Noise Ratio (SINR), or using some other measurement indicative of the goodness or sufficiency of the cell for providing communication service to the UE.

As noted, the UE or network may take the UE capabilities into consideration for omitting camping instruction for multi-cell configurations, such as CA and DC, that the UE does not support. Further, the UE may determine that only one cell provides coverage for the UE, subject to defined sufficiency requirements. In that situation, according to an example configuration, the UE selects its camping cell without calculating combined levels of coverage. More broadly, in a scenario where the UE calculates combined levels of coverage, the UE in one or more example embodiments is configured to exclude from consideration any cell that does not provide a defined minimum level of coverage.

In ranking examples above, the offset for the camping candidate is fixed and added depending on whether criteria are met for the related cell(s). The offset can also be based on the difference between the measurement on the related cell(s) and the threshold(s) applicable to the related cell(s).

FIG. 3 depicts an example embodiment of a wireless communication network 10 that is operative to provide one or more types of communication services to respective wireless devices 12. FIG. 1 depicts only two wireless devices 12 for convenience, shown as a UE 12-1 and a UE 12-2. The wireless communication network 10—the network 10—includes a core network (CN) part 14 and a radio access network (RAN) part 16. For example purposes, the CN 14 comprises a Fifth Generation CN (5GC), and the RAN 16 comprises a 5G RAN (Next Generation or NG RAN).

As a non-limiting example, the RAN 16 includes a plurality of radio access nodes 22 that may be of the same or differing types. Here, four radio access points 22-1, 22-2, 22-3, and 22-4 are shown for discussion purposes. The radio access points 22-1 and 22-2 are 5G radio access points referred to as gNBs and provide New Radio (NR) air interfaces, while the radio access points 22-3 and 22-3 are 4G radio access points with backhaul connectivity to the 5GC 14 and are referred to as ng-eNBs.

The depicted arrangement is not a limiting example and instead provides a basis for understanding example multi-cell options for a wireless device 12 with respect to connecting with and being served by the network 10. Corresponding, FIG. 1 depicts each radio access point 22 as providing a corresponding cell 24, i.e., the radio access point 22-1 provides a cell 24-1, the radio access point 22-2 provides a cell 24-2, the radio access point 22-3 provides a cell 24-3, and the radio access point 22-4 provides a cell 24-4. However, a single radio access point 22 may provide two or more cells 24 having full or partial overlap, e.g., by using different radio carrier frequencies. Broadly, the depicted cells 24 may all use the same frequency or there may be different frequencies involved. Similarly, one or more than one RAT may be involved. Further, the cells 24 may involve beamforming and may be directionally shaped or defined by one or more radio beams, such that overlapping cell coverage means overlapping radio beam coverage.

A given cell 24 neighbors another cell 24 if the two cells 24 abut or overlap. As a general proposition, the cell boundaries correspond to minimum-required coverage levels (signal levels) and neighboring cells share one or more overlapping regions in which a wireless device 12 can be served by either cell 24 or, if supported, in a multi-cell configuration involving both of the neighboring cells 24.

FIG. 4 depicts a possible arrangement of overlapping cell coverage for the four cells 24 shown in FIG. 3. In the diagram, the geographic location of the UE 12-1 means that it has a sufficient level of coverage only from the cell 24-1, whereas the geographic location of the UE 12-2 means that it has a sufficient level of coverage from multiple ones of the cells 24-1, 24-2, 24-3, and 24-4, for the depicted overlapping coverage arrangement. In this regard, according to techniques disclosed herein, at least the UE 12-2 can prioritize its cell selection operations while dormant, to account for multi-cell configuration possibilities when selecting which cell 24 it camps on. For example, upon determining that it has coverage by a cell 24 specified in conditional cell/frequency selection priorities indicated in priority information provided by the network, the UE applies those conditional priorities for selecting its dormant-state camping cell. The conditional priorities account for multi-cell configurations, e.g., by prioritizing one or more cells/frequencies that are included in one or more multi-cell configurations that are possible, if the UE has coverage by the cell/frequency specified in the priority information.

The radio access points 22, which also may be referred to as base stations, are subject to varied implementation. For example, FIG. 5 depicts an arrangement that distributes the functionality of the radio access points 22 between a centralized environment 30—e.g., a cloud data center—that implements radio control functions (RCFs) 32—and distributed radio nodes (RNs) 34. For example, an RCF 32-1 supports a radio node 34-1 and an RCF 32-2 supports a radio node 34-2. The RNs 34 provide the air-interface connections for UEs 12 operating in their respective coverage areas.

Figure 6:
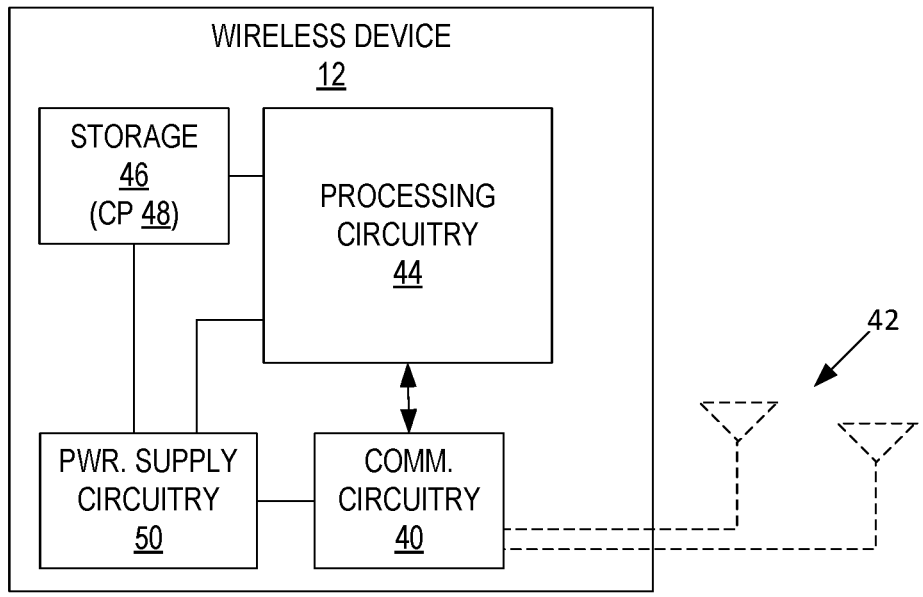
FIG. 6 is a block diagram of one embodiment of a wireless device configured to use a wireless communication network.

FIG. 6 illustrates an example embodiment of a wireless device 12, where the wireless device comprises communication circuitry 40 with one or more corresponding transmit/receive antennas 42, along with processing circuitry 44, storage 46, which may store one or more computer programs (CPs) 48, and power supply circuitry 50. The power supply circuitry 50 is configured to supply power to the wireless device 12, while the processing circuitry 44 is configured to determine a coverage level provided to the wireless device 12 by each cell 24 among a plurality of cells 24 of a wireless communication network, such as the network 10 shown in FIG. 3.

The processing circuitry 44 is further configured to select one cell 24 from among the plurality of cells 24 as a camping cell, for camping on by the wireless device 12 while the wireless device 12 is in a dormant state, according to the provided coverage levels and one or more cell prioritizations corresponding to one or more multi-cell configurations, each multi-cell configuration corresponding to serving the wireless device 12 using a respective combination of cells 24 from among the plurality of cells 24. Further, the processing circuitry is configured to cause the wireless device 12 to camp on the selected cell 24.

The processing circuitry 44 is configured, for example, to determine the coverage level provided to the wireless device 12 by each cell 24 among the plurality of cells 24 by making a radio-signal measurement with respect to each cell 24. The radio-signal measurement(s) for each cell 24 yield a resulting measurement value for each cell 24. Correspondingly, the processing circuitry 44 is configured to select the camping cell by ranking the cells 24 according to the respective measurement values, after offsetting one or more of the respective measurements according to the cell prioritizations corresponding to possible ones of the one or more multi-cell configurations.

As an example, the one or more cell prioritizations are defined by priority information corresponding to the one or more cell combinations. Then, the multi-cell configuration represented by a particular combination of cells is one of the possible multi-cell configurations if each cell 24 in the combination provides at least a threshold level of coverage to the wireless device 12. Put simply, the wireless device 12 and the network 10 may mutually support a plurality of multi-cell configurations but the configurations that are possible for the wireless device 12 at any given time depend on the particular cells 24 that provide a sufficient level of coverage to the wireless device 12.

In at least one example configuration, the processing circuitry 44 is configured to receive priority information from a radio access node 22 of the network 10, with the priority information indicating the one or more cell prioritizations. The priority information is received via the communication circuitry 40 of the wireless device 12. In an example embodiment, the communication circuitry 40 comprises radiofrequency circuitry configured for transmitting wireless signals and receiving wireless signals according to the air-interface specifications or requirements of one or more RATs supported by the network 10.

The processing circuitry 44 receives the priority information as dedicated signaling included in a release message sent to the wireless device 12 in conjunction with releasing the wireless device 12 from an active state to the dormant state. Additionally, or alternatively, the processing circuitry 44 is configured to receive the priority information as broadcasted signaling included in SI broadcasted by the radio access node 22.

As an example, the cell prioritizations that account for multi-cell possibilities are first cell prioritizations defined by first priority information and are used by the processing circuitry 44 to prioritize camping-cell selection according to possible multi-cell configurations. Further, second cell prioritizations are defined by second priority information and are used by the processing circuitry 44 to prioritize camping-cell selection according to frequency or Radio Access Technology (RAT) priorities.

In one or more embodiments, the processing circuitry 44 of the wireless device 12 is configured to use the first cell prioritizations as an alternative to the second cell prioritizations, at least for the cells 24 corresponding to the possible multi-cell configurations. Alternatively, the processing circuitry 44 is configured to apply both the first and second cell prioritizations. That is, the processing circuitry 44 may use both multi-cell prioritizations and frequency/RAT prioritizations to rank the cells 24 that are available for camping-cell selection. In any case, in an example arrangement, the processing circuitry 44 is configured to receive the second priority information via broadcasted signaling and receive the first priority information as dedicated signaling.

Figure 7:
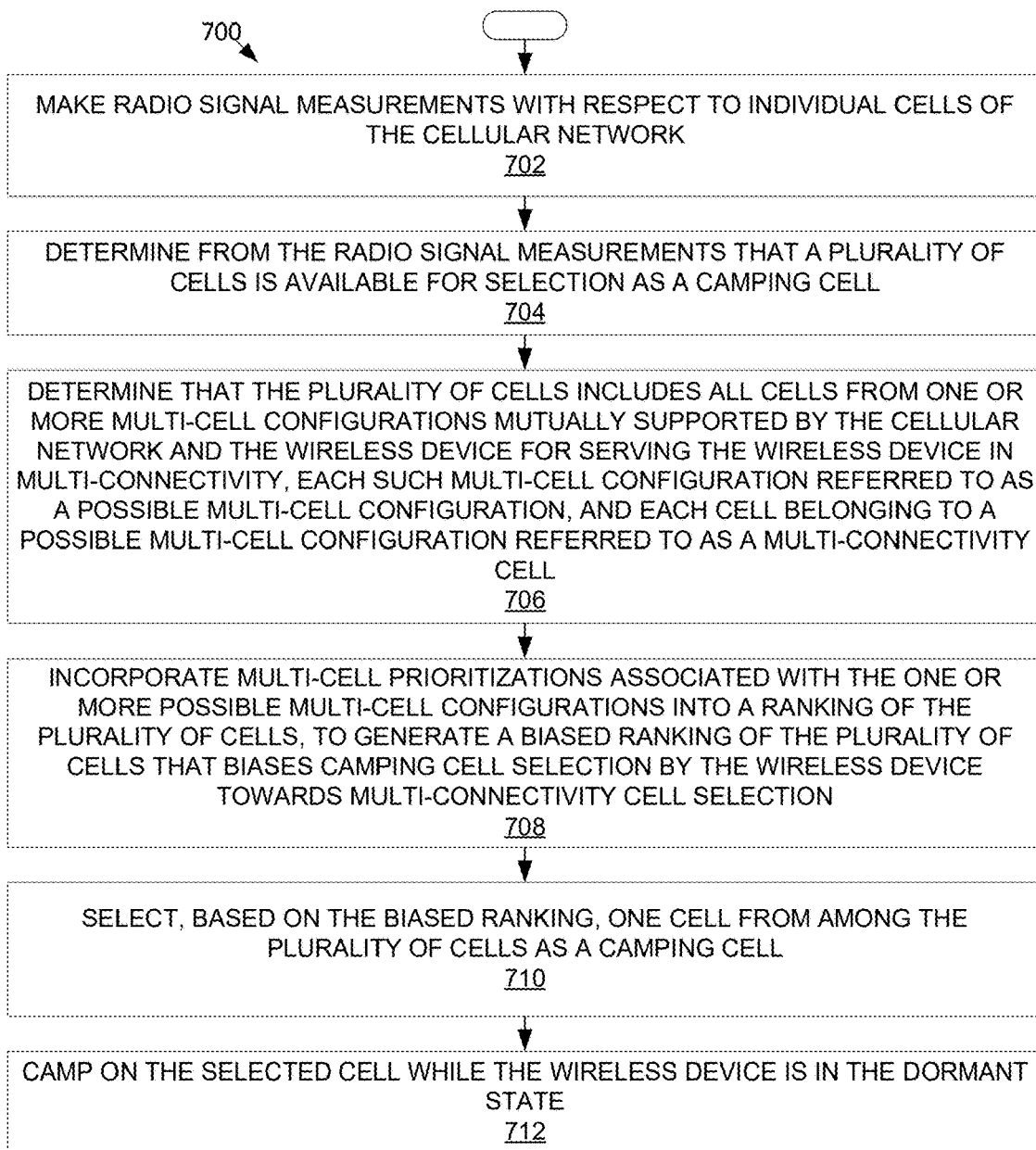
FIG. 7 is a logic flow diagram of another embodiment of a method of operation by a wireless device, for camping-cell selection.

FIG. 7 illustrates an example method 700 of operation by a wireless device 12. The method 700 includes the wireless device 12 making (Block 702) radio signal measurements with respect to individual cells 24 of a wireless communication network 10. This step can be understood as determining a coverage level provided to the wireless device 12 by each measured cell 24. The method 700 further includes determining (Block 704) from the radio signal measurements that a plurality of cells 24 is available for selection as a camping cell.

Still further, the method 700 includes determining (Block 706) that the plurality of cells 24 includes one or more multi-cell configurations mutually supported by the wireless communication network 10 and the wireless device 12 for serving the wireless device 12 in multi-connectivity. Each such multi-cell configuration is referred to as a "possible multi-cell configuration," and each cell 24 belonging to a possible multi-cell configuration is referred to as a "multi-connectivity cell." Additional corresponding operations in the method 700 include incorporating (Block 708) multi-cell prioritizations associated with the one or more possible multi-cell configurations into a ranking of the plurality of cells, to generate a biased ranking of the plurality of cells. The biased ranking biases camping cell selection by the wireless device 12 towards multi-connectivity cell selection.

The method 700 further includes selecting (Block 710), based on the biased ranking, one cell 24 from among the plurality of cells 24 as a camping cell, and camping (Block 712) on the selected cell 24 while the wireless device 12 is in the dormant state.

In one or more embodiments, making (Block 702) the radio signal measurements to determine the coverage level provided to the wireless device 12 by each cell 24 among the plurality of cells 24 comprises the wireless device 12 making a radio-signal measurement with respect to each cell 24, yielding a resulting measurement value for each cell 24. Biasing the ranking of the plurality of cells 24 comprises, for example, the wireless device 12 ranking the cells 24 according to the respective measurement values, after offsetting one or more of the respective measurements according to the cell prioritizations corresponding to possible ones of the one or more multi-cell configurations. The one or more cell prioritizations are defined by priority information corresponding to the one or more possible cell combinations, where a multi-cell configuration represented by a particular combination of cells 24 among the plurality of cells 24 is one of the possible multi-cell configurations if each cell 24 in the combination provides at least a threshold level of coverage to the wireless device 12.

The method 700 in one or more embodiments includes the wireless device 12 receiving priority information from a radio access node 22 of the wireless communication network 10, indicating the one or more cell prioritizations. In at least one embodiment, receiving the priority information comprises the wireless device 12 receiving the priority information as dedicated signaling included in a release message sent to the wireless device 12 in conjunction with releasing the wireless device 12 from an active state to the dormant state. In other embodiments, or under other circumstances, the method 700 includes the wireless device receiving the priority information as broadcasted signaling included in SI broadcasted by the radio access node 22.

The cell prioritizations that account for multi-cell configurations are first cell prioritizations, in one or more embodiments. The first prioritizations are defined by first priority information and are used by the wireless device 12 to prioritize camping-cell selection according to possible multi-cell configurations. Second cell prioritizations are defined by second priority information and are used by the wireless device 12 to prioritize camping-cell selection according to frequency or Radio Access Technology (RAT) priorities.

The first cell prioritizations are used as an alternative to the second cell prioritizations in one or more embodiments, at least for the cells 24 corresponding to the possible multi-cell configurations. In one or more other embodiments, the method 700 includes the wireless device 12 applying both the first and second cell prioritizations, when ranking available cells 24 for camping-cell selection. The method 700 in one or more embodiments includes the wireless device 12 receiving the second priority information via broadcasted signaling and receiving the first priority information as dedicated signaling.

Figure 8:
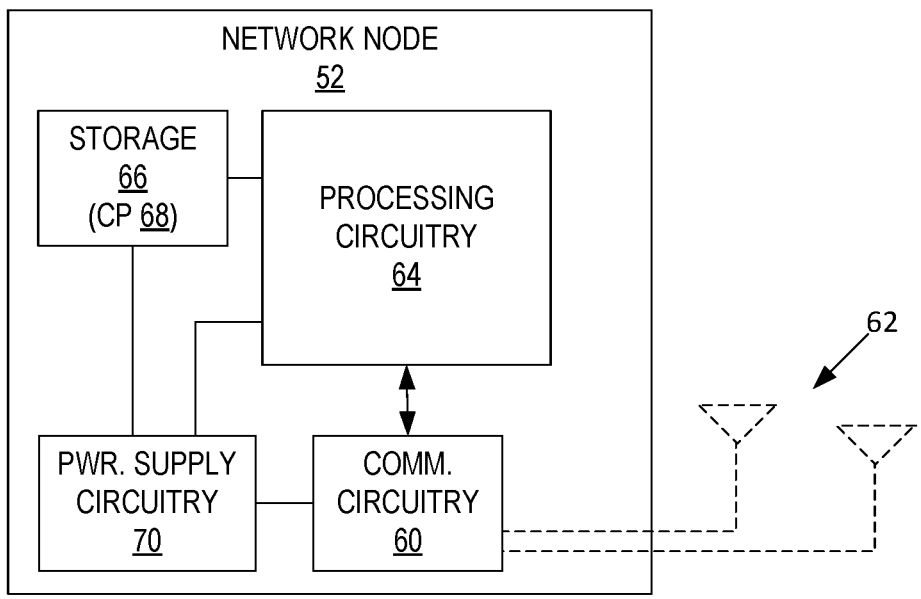
FIG. 8 is a block diagram of one embodiment of a network node configured for operation a wireless communication network.

FIG. 8 illustrates an example implementation of a network node 52 that is configured for operation in a wireless communication network, such as the network 10 depicted in FIG. 3. The network node 52 includes communication circuitry 60 that, in at least one embodiment or configuration of the network node 52 includes or is associated with one or more transmit/receive antennas 62, which may be configured for beamforming transmission or reception, or both. The network node 52 further includes processing circuitry 64 and associated storage 66, which may store one or more computer programs (CPs) 68. Still further, the network node 52 includes power supply circuitry 70 that is configured to supply power to the network node 52.

Although depicted as an integral node or entity, distributed implementations of the network node 52 are also contemplated. For example, in at least one embodiment, the network node 52 is a radio access node 22, such as shown in FIG. 6. Correspondingly, as shown in FIG. 5, the functionality of the radio access node 22 may be split between centralized processing operations and distributed radio components. Thus, the processing circuitry 64 may reside in whole or in part in a centralized RCF 32, or in whole or in part in a distributed RN 34 or may be distributed between an RCF 32 and an RN 34.

Split arrangements also have implications for the communication circuitry 60. In an integral implementation, the communication circuitry 60 includes, for example, both radiofrequency circuitry configured to provide the air interface (downlink and uplink radio signaling via the antenna(s) 62), and network interface circuitry for communicatively coupling to other entities in the network 10—e.g., backhaul connections to the CN 14 and sidehaul connections to other radio access nodes 22. The "NG" connections in FIG. 3 are one example of backhaul connections, while the "Xn" connections are example sidehaul connections. The power supply circuitry also may be split between RCF and RN instantiations.

Regardless of the implementation details, the processing circuitry 64 in one or more embodiments is configured to: generate priority information indicating one or more cell prioritizations corresponding to one or more multi-cell configurations, each multi-cell configuration corresponding to serving a wireless device 12 using a respective combination of cells 24 from among a plurality of cells 24 of the network 10; and transmit the priority information, for reception by the wireless device 12. Here, the processing circuitry 64 "transmits" the priority information directly on the air interface, via the communication circuitry 60, or, in an RCF/RN scenario, the processing circuitry 64 may reside in an RCF 32. In that case, the communication circuitry 60 includes computer-network or other interface circuitry used by the processing circuitry 64 to send the priority information to a RN 34, and the RN 34 transmits it in radio signaling sent over the air interface. In any case, the priority information enables the wireless device 12 to account for multi-cell configurations when prioritizing cells 24 among the plurality of cells 24 for camping-cell selection by the wireless device 12 when while in a dormant state.

In one or more embodiments, the processing circuitry 64 is configured to transmit the priority information via the communication circuitry 60, based on including the priority information in one or more Information Elements (IEs) included in a connection-release message transmitted by a radio access node 22, for releasing the wireless device 12 from an active state to the dormant state.

In one or more embodiments, the processing circuitry 64 is configured to determine the plurality of cells 24 as at least one of: cells 24 having coverage areas overlapping or neighboring a current serving cell of the wireless device 12, and cells 24 identified in a cell-measurement report transmitted by the wireless device 12.

In one or more embodiments, the processing circuitry 64 is configured to determine the one or more cell prioritizations according to at least one of: load balancing among the plurality of cells 24 and expected throughputs for serving the wireless device 12 for respective combinations among the plurality of cells 24. Each combination corresponds to a multi-cell configuration mutually supported by the network 10 and the wireless device 12. Knowledge of the multi-cell configurations supported by the wireless device 12 comes, for example, from a capability report transmitted by the wireless device 12.

Figure 9:
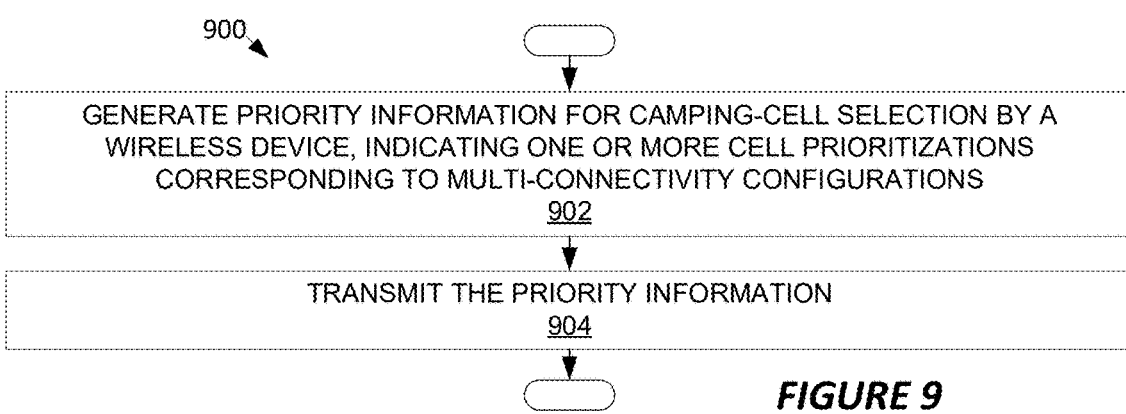
FIG. 9 is a logic flow diagram of one embodiment of a method of operation by a base station, to facilitate camping-cell selection by a wireless device.

FIG. 9 illustrates an example method 900 of operation by a network node 52, such as a radio access node 22 in integrated or distributed form. The method 900 includes the network node 52 generating (Block 902) priority information indicating one or more cell prioritizations corresponding to one or more multi-cell configurations. Each multi-cell configuration corresponds to serving a wireless device 12 using a respective combination of cells 24 from among a plurality of cells 24 of the involved network 10. The plurality of cells 24 may involve the same carrier frequency or different carrier frequencies and may involve the same RAT or different RATs.

The method 900 further includes transmitting (Block 904) the priority information, for reception by the wireless device 12. Here, the network node 52 may include the radio circuitry used to provide an air interface for signaling the wireless device 12 and may transmit the priority information directly to the wireless device 12 via the air interface. Alternatively, the network node 52 transmits the priority information via network signaling to a radio access node 22 associated with the serving cell of the device 2. In any case, the priority information enables the wireless device 12 to account for multi-cell configurations when prioritizing cells 24 among the plurality of cells 24 for camping-cell selection by the wireless device 12 while operating in a dormant state.

Transmitting (Block 904) the priority information comprises, for example, including the priority information in one or more IEs included in a connection-release message transmitted by the network node 52 or an associated radio access node 22, for releasing the wireless device 12 from an active state to the dormant state.

In at least one embodiment, the method 900 includes the network node 52 determining the plurality of cells 24 as at least one of: cells 24 having coverage areas overlapping or neighboring a current serving cell of the wireless device 12, or cells 24 identified in a cell-measurement report transmitted by the wireless device 12. Further, the method 900 may include the network node 52 determining the one or more cell prioritizations according to at least one of: load balancing among the plurality of cells 24, or expected throughputs for serving the wireless device 12 for respective combinations among the plurality of cells 24, with each combination corresponding to a multi-cell configuration mutually supported by the network 10 and the wireless device 12.

Figure 10:
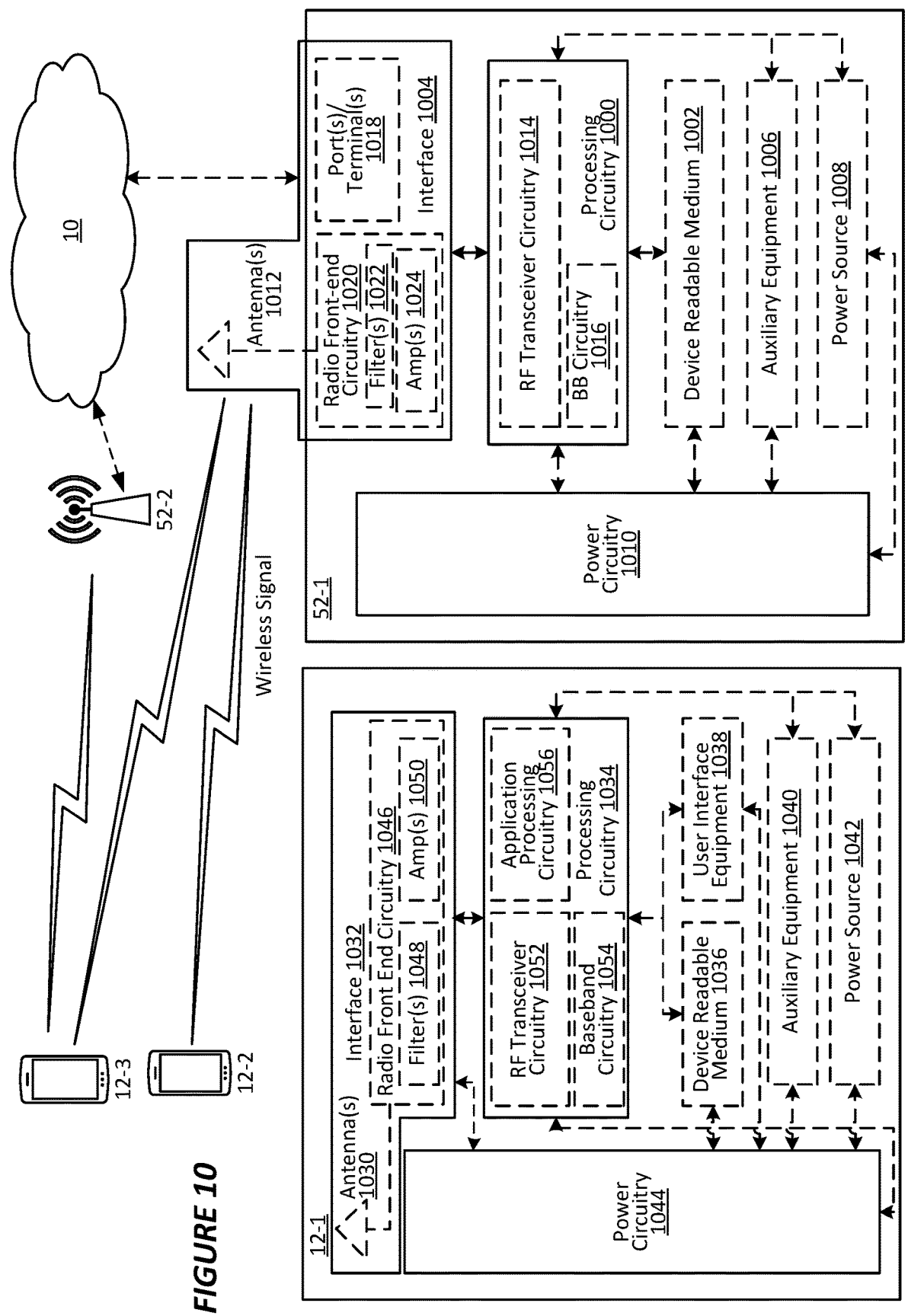
FIG. 10 is a block diagram of another embodiment of a wireless communication network, shown in relation to wireless devices configured to use the network.

FIG. 10 depicts another embodiment of a wireless network in accordance with some embodiments.

Although the subject matter described herein may be implemented in any appropriate type of system using any suitable components, the embodiments disclosed herein are described in relation to the example wireless network 10 illustrated in FIG. 10. For simplicity, the wireless network of FIG. 10 only depicts the network 10 with network nodes 52-1 and 52-2, and wireless devices (WDs) 12-1, 12-2, and 12-3. In this example, the network nodes 52 are operative as radio access nodes of the network 10—see, e.g., the radio access nodes 22 of FIG. 3, for example.

In practice, the network 10 may further include any additional elements suitable to support communication between wireless devices or between a wireless device and another communication device, such as a landline telephone, a service provider, or any other network node or end device. Of the illustrated components, the network node 52-1 and the WD 12-1 are depicted with additional detail. The wireless network 10 may provide communication and other types of services to one or more WDs to facilitate access to and/or use of the services provided by, or via, the wireless network 10. In particular, one or more of the WDs 12 and one or more of the network nodes 52 are configured to perform the methods as discussed herein for camping-cell selection by a WD 12 while the WD 12 is in a dormant state.

The wireless network 10 may comprise and/or interface with any type of communication, telecommunication, data, cellular, and/or radio network or other similar type of system. In some embodiments, the wireless network 10 is configured to operate according to specific standards or other types of predefined rules or procedures. Thus, particular embodiments of the wireless network 10 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. The WDs 12 configured to access and use the wireless network 10 may utilize any combination of RATs.

In one or more embodiments, the network 10 comprises one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices, such as between WDs 12 and remote servers or other equipment.

For operation according to the techniques disclosed herein, the example network node 52 and the example WD 12 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, the term "network node" broadly refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network 10. Examples of a "network node" include, but are not limited to, access points (APs) (e.g., radio access points), base stations (BSs) (e.g., radio base stations, Node Bs, evolved Node Bs (eNBs) and NR NodeBs (gNBs)), as discussed above. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a WD 12 with access to the wireless network 10 or to provide some service to a WD 12 that has accessed the wireless network 10.

In FIG. 10, the example network node 52-1 includes processing circuitry 1000, device readable medium 1002, interface 1004, auxiliary equipment 1006, power source 1008, power circuitry 1010, and antenna 1012. Although the network node 52-1 illustrated in the example wireless network 10 of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 52-1 are depicted as single boxes located within a larger box, or nested within multiple boxes, in practice, a network node 52 may comprise multiple different physical components that make up a single illustrated component (e.g., device readable medium 1002 may comprise multiple separate hard drives as well as multiple RAM modules).

Recognizing that any one or more network nodes 52 may have the configuration of the network node 52-1 depicted in FIG. 10, further references to example details for the operations and componentry of the network node 52-1 drop the suffixing, in favor of referring simply to a network node 52.

As noted, in an example embodiment, the network node 52 is a radio access node 22, such as shown in FIG. 3, but that is a non-limiting example and the network node 52 does not necessarily operate as a radio access node 22 in the network 10.

The network node 52 may be composed of multiple physically separate components (e.g., a NodeB component and a Radio Network Controller (RNC) component, or a Base Transceiver Station (BTS) component and a Base Station Controller (BSC) component, etc.), which may each have their own respective components. In certain scenarios in which the network node 52 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 52 is configured to support multiple radio access technologies (RATs).

In at least one such embodiment, some components are duplicated (e.g., separate device readable medium 1002 for the different RATs) and some components may be reused (e.g., the same antenna 1012 may be shared by the RATs). The network node 52 in one or more embodiments also includes multiple sets of the various illustrated components for different wireless technologies integrated into the network node 52, such as, for example, GSM, WCDMA, LTE, NR, WI-FI, or BLUETOOTH wireless technologies. These wireless technologies may be integrated into the same or different chip or set of chips and other components within the network node 52.

The processing circuitry 1000 is configured to perform any determining, calculating, or similar operations (e.g., certain obtaining operations) described herein as being provided by a network node 52. These operations performed by the processing circuitry 1000 may include processing information obtained by the processing circuitry 1000 by, for example, converting the obtained information into other information, comparing the obtained information or converted information to information stored in the network node 52, and/or performing one or more operations based on the obtained information or converted information, and as a result of said processing making a determination.

In one or more embodiments, the processing circuitry 1000 comprises a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide the network-node functionality described herein, either alone or in conjunction with other components of the network node 52, such as the device readable medium 1002. For example, in at least one embodiment, the processing circuitry 1000 executes instructions stored in the device readable medium 1002 or in memory within the processing circuitry 1000. Such functionality may include providing any of the various wireless features, functions, or benefits discussed herein. In some embodiments, the processing circuitry 1000 comprises a system on a chip (SOC).

In some embodiments, the processing circuitry 1000 includes one or more of a radio frequency (RF) transceiver circuitry 1014 and baseband processing circuitry 1016. In some embodiments, RF transceiver circuitry 1014 and baseband processing circuitry 1016 may be on separate chips (or sets of chips), boards, or units, such as radio units and digital units. FIG. 10 denotes the baseband processing circuitry 1016 as "BB Circuitry 1016" for brevity. In one or more alternative embodiments, part or all of RF transceiver circuitry 1014 and baseband processing circuitry 1016 are on the same chip or set of chips, boards, or units.

Further, in one or more embodiments, some or all of the functionality described herein as being provided by a network node 52 is performed by processing circuitry 1000 executing instructions stored on device readable medium 1002 or memory within processing circuitry 1000. In alternative embodiments, some or all the functionality of the network node 52 is realized by the processing circuitry 1000 without executing instructions stored on a separate or discrete device readable medium. That is, the processing circuitry 1000 has a hard-wired configuration in such embodiments. Regardless of its implementation particulars, the processing circuitry 1000 is configured to perform the functionality described herein for a network node 52. The benefits provided by such functionality are not limited to the processing circuitry 1000 alone or to other components of the network node 52, but are enjoyed by the network node 52 as a whole, and/or by the wireless network 10 generally and/or respective ones of the WDs 12 using the wireless network 10 as "end users".

The device readable medium 1002 comprises any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1000. The device readable medium 1002 in one or more embodiments stores suitable instructions, data or other information, including a computer program, software, an application including one or more of logic, rules, code, tables, etc. and/or other instructions that are readable or otherwise executable by the processing circuitry 1000, and utilized by the network node 52. In at least one embodiment, the device readable medium 1002 stores calculations made by the processing circuitry 1000 and/or any data received via the interface 1004. In some embodiments, the processing circuitry 1000 and the device readable medium 1002 are integrated.

The interface 1004 is used in the wired or wireless communication of signaling and/or data between the network node 52 and one or more other nodes or components in the network, and/or between the network node 52 and one or more WDs 12. As illustrated, the interface 1004 comprises port(s)/terminal(s) 1018 to send and receive data, for example to and from one or more other components of the network 10 over a wired connection. The interface 1004 also includes radio front end circuitry 1020 that may be coupled to, or in certain embodiments a part of, the antenna(s) 1012. The radio front end circuitry 1020 comprises one or more filters 1022 and one or more amplifiers 1024—depicted in FIG. 10 as "Amp(s) 1024". The radio front end circuitry 1020 in one or more embodiments is connected to the antenna(s) 1012 and the processing circuitry 1000. For example, the radio front end circuitry 1020 is configured to condition signals communicated between the antenna(s) 1012 and the RF transceiver circuitry 1014 and the baseband processing circuitry 1016 included in or associated with the processing circuitry 1000. Further, in one or more embodiments, the radio front end circuitry 1020 receives digital data that is to be sent out to other nodes in the network 10 or to WDs 12 via a wireless connection. For example, the radio front end circuitry 1020 is configured to convert the digital data into a radio signal having the appropriate channel and bandwidth parameters using a combination of the filter(s) 1022 and/or the amplifier(s) 1024. The radio signal may then be transmitted via the antenna(s) 1012. Similarly, when receiving data, the antenna(s) 1012 may collect radio signals which are then converted into digital data by the radio front end circuitry 1020. The digital data may be passed to processing circuitry 1000. In other embodiments, the interface may comprise different components and/or different combinations of components. For example, the baseband circuitry 1016 processes outgoing data for transmission in the digital domain and the RF transceiver circuitry 1014 generates a corresponding modulated signal, for further amplification via the radio front-end circuitry 1020, for transmission via the antenna(s) 1012. A similar radio-signal processing chain applies in reverse, with the radio front-end circuitry 1020 providing a filtered and amplified version of incoming antenna signals to the RF transceiver circuitry 1014 for down-conversion and digitization, with the baseband processing circuitry 1016 processing the digitized signal samples for information recovery.

In certain alternative embodiments, network node 52 does not include separate radio front end circuitry 1020. Instead, the processing circuitry 1000 comprises radio front end circuitry and may be connected to the antenna(s) 1012 without using a separate radio front end circuitry 1020. Similarly, in some embodiments, all or some of the RF transceiver circuitry 1014 may be considered a part of the interface 1004. In still other embodiments, the interface 1004 may include one or more ports or terminals 1018, the radio front end circuitry 1020, and the RF transceiver circuitry 1014, as part of a radio unit (not shown), and the interface 1004 may communicate with the baseband processing circuitry 1016, which is part of a digital unit (not shown).

The antenna(s) 1012 include one or more antennas, or antenna arrays, configured to send and/or receive wireless signals. The antenna(s) 1012 may be coupled to the radio front end circuitry 1020 and may be any type of antenna(s) capable of transmitting and receiving data and/or signals wirelessly. In some embodiments, the antenna(s) 1012 comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple-Input-Multiple-Output (MIMO). In certain embodiments, the antenna(s) 1012 are separate from the network node 52 and are connectable to the network node 52 through an interface or port.

In one or more embodiments, the antenna(s) 1012, the interface 1004, and/or the processing circuitry 1000 is/are configured to perform any receiving operations and/or certain obtaining operations described herein as being performed by a network node 52. Any information, data and/or signals may be received from a wireless device, another network node and/or any other network equipment. Similarly, the antenna(s) 1012, the interface 1004, and/or the processing circuitry 1000 may be configured to perform any transmitting operations described herein as being performed by a network node 52. Any information, data and/or signals may be transmitted to a wireless device, another network node and/or any other network equipment.

The power circuitry 1010 comprise or is coupled to power management circuitry and is configured to supply the components of the network node 52 with power for performing the functionality described herein. The power circuitry 1010 receives power, for example, from the power source 1008. The power source 1008 and/or the power circuitry 1010 may be configured to provide power to the various components of network node 52 in a form suitable for the respective components, e.g., at a voltage and current level needed for each respective component. The power source 1008 may be included in the power circuitry 1010 or may be external to the power circuitry 1010 or the network node 52 at large. For example, the network node 52 in one or more configurations is connectable to an external power source, such as an electricity outlet, via an input circuitry or interface such as an electrical cable, whereby the external power source supplies power to the power circuitry 1010. As a further example, the power source 1008 may comprise a source of power in the form of a battery or battery pack which is connected to, or integrated in, the power circuitry 1010. The battery serves as a backup power source in one or more embodiments, should an external power source fail. Other types of power sources, such as photovoltaic devices, may also be used.

Alternative embodiments of network node 52 may include additional components beyond those shown in FIG. 10 that may be responsible for providing certain functions of the network node 52, including any of the functionality described herein and/or any functionality necessary to support the subject matter described herein. For example, network node 52 may include user interface equipment (not shown) to allow the input of information into the network node 52 and to allow output of information from the network node 52. These input/output functions allow a user to perform diagnostic, maintenance, repair, and other administrative functions for the network node 52.

As used herein, the term "wireless device" or "WD" refers to a device capable, configured, arranged and/or operable to communicate wirelessly with network nodes and/or other wireless devices. Unless otherwise noted, the term WD may be used interchangeably herein with "User Equipment" or "UE". Thus, a WD comprises essentially any type of wireless communication apparatus that is configured to access and use a wireless communication network, such as the network 10. For example, a WD uses the network 10 as an "access network" for communicating with other WDs and/or for gaining access to a server or other device, system, or equipment, that is available via the Internet or other network accessible via the network 10.

Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as a Machine Type Communication (MTC) device. As one example, a WD is a UE implementing the 3GPP narrow band internet of things (NB-IoT) standard. Specific examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD is part of or associated with a vehicle or other equipment and is configured for monitoring and/or reporting on the operational status or other functions associated with operation of the vehicle or other equipment. A WD as described herein also may represent the endpoint of a wireless connection, in which case the WD may be referred to as a "wireless terminal". Furthermore, a WD as described above may be mobile, in which case it may also be referred to as a "mobile device" or a "mobile terminal".

FIG. 10 illustrates example details for implementation of a WD, shown in the context of WD 12-1. However, as WD 12-1 stands as a general but non-limiting example of implementing a WD 12 having the functionality described herein, the following details refer generally to a WD 12.

The depicted WD 12 includes antenna(s) 1030, an interface 1032, processing circuitry 1034, a device readable medium 1036, user interface equipment 1038, auxiliary equipment 1040, a power source 1042, and power circuitry 1044. The WD 12 may include multiple sets of one or more of the illustrated components for different wireless technologies supported by WD 12, such as, for example, GSM, WCDMA, LTE, NR, WI-FI, WiMAX, or BLUETOOTH wireless technologies, just to mention a few. These wireless technologies may be integrated into the same or different chips or set of chips as other components within the WD 12.

The antenna(s) 1030 may include one or more antennas or antenna arrays, configured to send and/or receive wireless signals, and is/are connected to the interface 1032. In certain alternative embodiments, the antenna(s) 1030 are separate from the WD 12 and connect to the WD 12 through an interface or port. The antenna(s) 1030, the interface 1032, and/or the processing circuitry 1034 may be configured to perform any receiving or transmitting operations described herein as being performed by a WD. Any information, data and/or signals may be received from a network node, such as a network node 52, and/or another WD. In some embodiments, radio front end circuitry and/or the antenna(s) 1030 may be considered as one type of interface included in the WD 12.

In the illustration, for example, the interface 1032 comprises radio front end circuitry 1046 and antenna 1030. The radio front end circuitry 1046 comprise one or more filters 1048 and one or more amplifiers 1050, labeled as "Amp(s) 1050". The radio front end circuitry 1046 connects to the antenna(s) 1030 and the processing circuitry 1034 and is configured to condition signals communicated between the antenna(s) 1030 and the processing circuitry 1034. Broadly, the radio front end circuitry 1046 may be coupled to or a part of the antenna(s) 1030.

In some embodiments, the WD 12 does not include separate radio front end circuitry 1046. Instead, the processing circuitry 1034 includes radio front end circuitry and connects to the antenna(s) 1030. For example, the processing circuitry 1034 includes or is associated with RF transceiver circuitry 1052, which may be considered a part of the interface 1032, at least on a functional basis.

However it is implemented within the WD 12, the radio front end circuitry 1046 may receive digital data that is to be sent out to other network nodes or WDs via a wireless connection. In one or more embodiments, the radio front end circuitry 1046 is configured to convert the digital data into a radio signal having the appropriate channel and bandwidth parameters using a combination of the filter(s) 1048 and/or the amplifier(s) 1050. The radio signal is then be transmitted via the antenna(s) 1030. Similarly, for receiving radio signals, the antenna(s) 1030 may collect the radio signals which are then converted into digital data by the radio front end circuitry 1046. The digital data passes to the processing circuitry 1034, for processing, e.g., the recovery of data or control signaling. In other embodiments, the interface may comprise different components and/or different combinations of components.

The processing circuitry 1034 in one or more embodiments comprises a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide the functionality attributed herein to a WD 12, either alone or in conjunction with other components of the WD 12, such as the device readable medium 1036, the interface 1032, etc. Such functionality may include providing any of the various wireless features or benefits discussed herein. For example, the processing circuitry 1034 may execute instructions stored in the device readable medium 1036 or in memory within processing circuitry 1034 to provide the functionality disclosed herein.

In at least one embodiment, the processing circuitry 1034 includes one or more of RF transceiver circuitry 1052, baseband processing circuitry 1054, and application processing circuitry 1056. In other embodiments, the processing circuitry 1034 comprises different components and/or different combinations of components. In at least one embodiment of the WD 12, the processing circuitry 1034 comprises a SOC.

Further, in one or more embodiments, the RF transceiver circuitry 1052, the baseband processing circuitry 1054, and the application processing circuitry 1056 are on separate chips or sets of chips. As an alternative, part or all of the baseband processing circuitry 1054 and the application processing circuitry 1056 are combined into one chip or set of chips, and the RF transceiver circuitry 1052 is on a separate chip or set of chips. In still other embodiments, part or all of the RF transceiver circuitry 1052 and the baseband processing circuitry 1054 are on the same chip or set of chips, and the application processing circuitry 1056 is on a separate chip or set of chips. As a further alternative, part or all of the RF transceiver circuitry 1052, the baseband processing circuitry 1054, and the application processing circuitry 1056 are combined in the same chip or set of chips. In at least one embodiment, the RF transceiver circuitry 1052 is a part of the interface 1032, at least functionally.

As such, the RF transceiver circuitry 1052 may condition RF signals for the processing circuitry 1034. For example, radio signals incoming via the antenna(s) 1030 undergo initial conditioning in the radio front end circuitry 1046, such as filtering and amplification. The conditioned incoming signals undergo down-conversion, demodulation, and digitization via the RF transceiver circuitry 1052, and the baseband circuitry 1054 processes the digitized signal samples to recover the contained information, e.g., user-plane data and/or control signaling. Similar processing in the reverse radio-chain direction applies for data and control signaling to be transmitted by the WD via the antenna(s) 1030.

In certain embodiments, some or all of the functionality described herein as being performed by a WD may be provided by the processing circuitry 1034 executing instructions stored on the device readable medium 1036, which in certain embodiments may be a computer-readable storage medium. In alternative embodiments, some or all the functionality is provided by the processing circuitry 1034 without executing instructions stored on a separate or discrete device readable storage medium, such as where the processing circuitry 1034 is hard-wired. Whether hard-wired or programmatically configured according to the execution of program instructions, the processing circuitry 1034 performs the described functionality. The benefits provided by such functionality are not limited to the processing circuitry 1034 alone or to other components of the WD 12 but are enjoyed by the WD 12 as a whole, as an end user of the wireless network 10.

The processing circuitry 1034 may be configured to perform any determining, calculating, or similar operations (e.g., certain obtaining operations) described herein as being performed by a WD. These operations, as performed by the processing circuitry 1034, may include processing information obtained by processing circuitry 1034 by, for example, converting the obtained information into other information, comparing the obtained information or converted information to information stored by the WD, and/or performing one or more operations based on the obtained information or converted information, and as a result of said processing making a determination.

The device readable medium 1036 in one or more embodiments stores a computer program, an application or other software including one or more of logic, rules, code, tables, etc., and/or other instructions that are executable by the processing circuitry 1034. As an example, the device readable medium 1036 includes computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions for reading and/or executing by the processing circuitry 1034. In some embodiments, the processing circuitry 1034 and the device readable medium 1036 are integrated.

In at least one embodiment, the WD 12 includes the depicted user interface equipment 1038, and it provides components that allow for a human user to interact with the WD 12. Example interactions include any one or more of visual, audial, tactile, etc. The user interface equipment 1038 in one or more embodiments is configured to produce output to a user of the WD 12 and to allow the user to provide input to the WD 12. The type of interaction varies in dependence on the implementation of the user interface equipment 1038. For example, the user interface equipment 1038 may include a touchscreen for a smartphone implementation of the WD 12. In a smart meter implementation of the WD 12, the user interface equipment 1038 includes a screen or a speaker for outputting usage information (e.g., the number of gallons used), or for outputting an audible alert (e.g., if smoke is detected). The user interface equipment 1038 includes, for example, one or more input interfaces, devices and circuits, and one or more output interfaces, devices and circuits.

In one or more example configurations, the user interface equipment 1038 is configured to allow input of information into the WD 12 and is connected to the processing circuitry 1034 to allow processing circuitry 1034 to process the input information. The user interface equipment 1038 includes, for example, a microphone, a proximity or other sensor, keys/buttons, a touch display, one or more cameras, a USB port, or other input circuitry. The user interface equipment 1038 may also be configured to provide for the output of information from the WD 12, and to allow the processing circuitry 1034 to output information from the WD 12. For example, in at least one embodiment, the user interface equipment 1038 includes any one or more of a speaker, a display, vibrating circuitry, a USB port, a headphone interface, or other output circuitry. The WD 12 may use such circuitry to provide the benefits of its operation to any one or more of a user of the WD 12, other WDs 12, one or more nodes of the network 10, or one or more servers, equipments, or devices accessible via the network 10.

The auxiliary equipment 1040 in one or more embodiments is operable to provide more specific functionality which may not be generally performed by WDs. For example, in at least one embodiment, the auxiliary equipment 1040 comprises specialized sensors for doing measurements for various purposes and/or interfaces for additional types of communication, such as wired communications, etc. The inclusion and type of components of auxiliary equipment 1040 will vary, depending on the embodiment and/or scenario.

In at least one embodiment of the WD 12, the power source 1042 is a battery or battery pack. Other types of power sources, such as an external power source (e.g., an electricity outlet), photovoltaic devices or power cells, may also be used. The power circuitry 1044 is configured to deliver power from the power source 1042 to the various parts of the WD 12 which need power from the power source 1042 to carry out any functionality described or indicated herein.

The power circuitry 1044 in certain embodiments comprises power management circuitry. The power circuitry 1044 may additionally or alternatively be operable to receive power from an external power source. In such cases, the WD 12 is configured for connection to the external power source (such as an electricity outlet) via input circuitry or an interface, such as an electrical power cable. The power circuitry 1044 may also in certain embodiments be configured to deliver power from an external power source to the power source 1042. This may be, for example, for the charging of power source 1042. The power circuitry 1044 may perform any formatting, converting, or other modification to the power from power source 1042 to make the power suitable for the respective components of WD 12 to which power is supplied.

Figure 11:
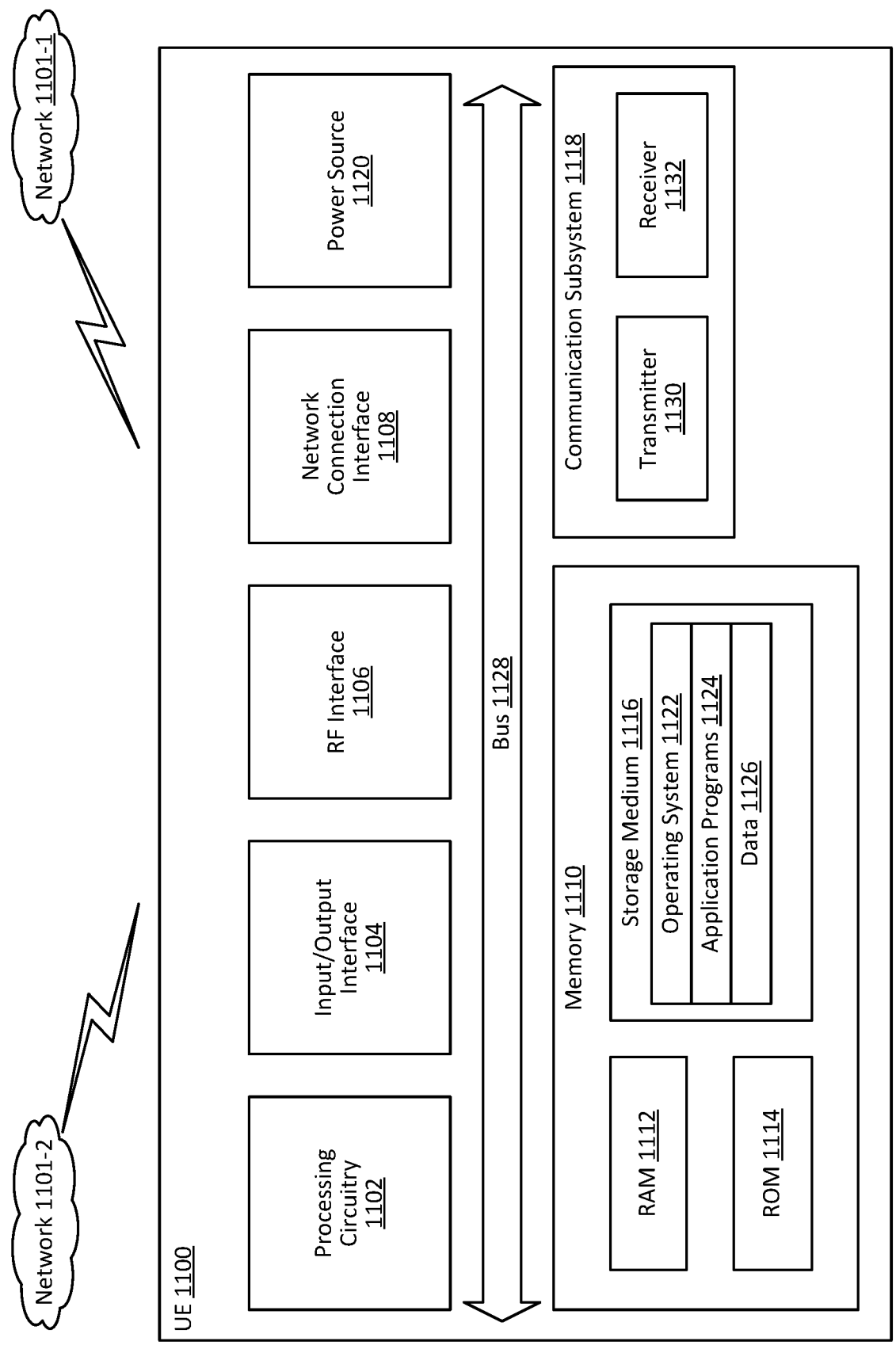
FIG. 11 is a block diagram of another embodiment of a wireless device that is configured to use one or more wireless communication networks of the same or different types.

FIG. 11 illustrates another example embodiment of a WD 12, labeled in the diagram as a "UE 1100". As used herein, a user equipment or UE does not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, the UE 1100 includes processing circuitry 1102 that is operatively coupled to input/output interface 1104, radio frequency (RF) interface 1106, network connection interface 1108, memory 1110 including random access memory (RAM) 1112, read-only memory (ROM) 1114, and storage medium 1116 or the like, communication subsystem 1118, power source 1120, and/or any other component, or any combination thereof. Storage medium 1116 includes operating system 1122, application program 1124, and data 1126. In other embodiments, storage medium 1116 may include other similar types of information. Certain UEs may utilize all the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1102 may be configured to process computer instructions and data. Processing circuitry 1102 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1102 may include two central processing units (CPUs). Data may be information in a form suitable for use by a computer.

In the depicted embodiment, input/output interface 1104 may be configured to provide a communication interface to an input device, output device, or input and output device. UE 1100 may be configured to use an output device via input/output interface 1104. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1104 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1106 may be configured to provide a communication interface to RF components such as a transmitter, a receiver, and an antenna. Network connection interface 1108 may be configured to provide a communication interface to one or more wireless communication networks 1101-1 and/or 1101-2. Here, a network 1101 encompass wired and/or wireless networks such as a local-area network (LAN), a wide-area network (WAN), a computer network, a wireless network, a telecommunications network, another like network or any combination thereof. For example, a network 1101 may comprise a Wi-Fi network. Network connection interface 1108 may be configured to include a receiver and a transmitter interface used to communicate with one or more other devices over a communication network according to one or more communication protocols, such as Ethernet, TCP/IP, SONET, ATM, or the like. Network connection interface 1108 may implement receiver and transmitter functionality appropriate to the communication network links (e.g., optical, electrical, and the like). The transmitter and receiver functions may share circuit components, software or firmware, or alternatively may be implemented separately.

RAM 1112 may be configured to interface via bus 1128 to processing circuitry 1102 to provide storage or caching of data or computer instructions during the execution of software programs such as the operating system, application programs, and device drivers. ROM 1114 may be configured to provide computer instructions or data to processing circuitry 1102. For example, ROM 1114 may be configured to store invariant low-level system code or data for basic system functions such as basic input and output (I/O), startup, or reception of keystrokes from a keyboard that are stored in a non-volatile memory. Storage medium 1116 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1116 may be configured to include operating system 1122, application program 1124 such as a web browser application, a widget or gadget engine or another application, and data file 1126. Storage medium 1116 may store, for use by UE 1100, any of a variety of various operating systems or combinations of operating systems.

Storage medium 1116 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1116 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1116, which may comprise a device readable medium.

In FIG. 11, processing circuitry 1102 may be configured to communicate with network 1102-2 using communication subsystem 1118. Network 1101-1 and network 1101-2 may be the same network(s) or different networks. Communication subsystem 1118 may be configured to include one or more transceivers used to communicate with network 1101-1 and/or 1101-2. For example, communication subsystem 1118 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1130 and/or receiver 1132 to implement transmitter or receiver functionality, respectively, appropriate to the RAN links (e.g., frequency allocations and the like). Further, transmitter 1130 and receiver 1132 of each transceiver may share circuit components, software or firmware, or alternatively may be implemented separately.

In the illustrated embodiment, the communication functions of communication subsystem 1118 may include data communication, voice communication, multimedia communication, short-range communications such as BLUETOOTH, near-field communication, location-based communication such as the use of the global positioning system (GPS) to determine a location, another like communication function, or any combination thereof. For example, communication subsystem 1118 may include cellular communication, WI-FI communication, BLUETOOTH communication, and GPS communication. Network 1101-1 or 1101-2 may encompass wired and/or wireless networks such as a local-area network (LAN), a wide-area network (WAN), a computer network, a wireless network, a telecommunications network, another like network or any combination thereof. For example, a network 1101 may be a cellular network, a WI-FI network, and/or a near-field network. Power source 1120 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1118 may be configured to include any of the components described herein. Further, processing circuitry 1102 may be configured to communicate with any of such components over bus 1128. In another example, any of such components may be represented by program instructions stored in memory that when executed by processing circuitry 1102 perform the corresponding functions described herein. In another example, the functionality of any of such components may be partitioned between processing circuitry 1102 and communication subsystem 1118. In another example, the non-computationally intensive functions of any of such components may be implemented in software or firmware and the computationally intensive functions may be implemented in hardware.

Figure 12:
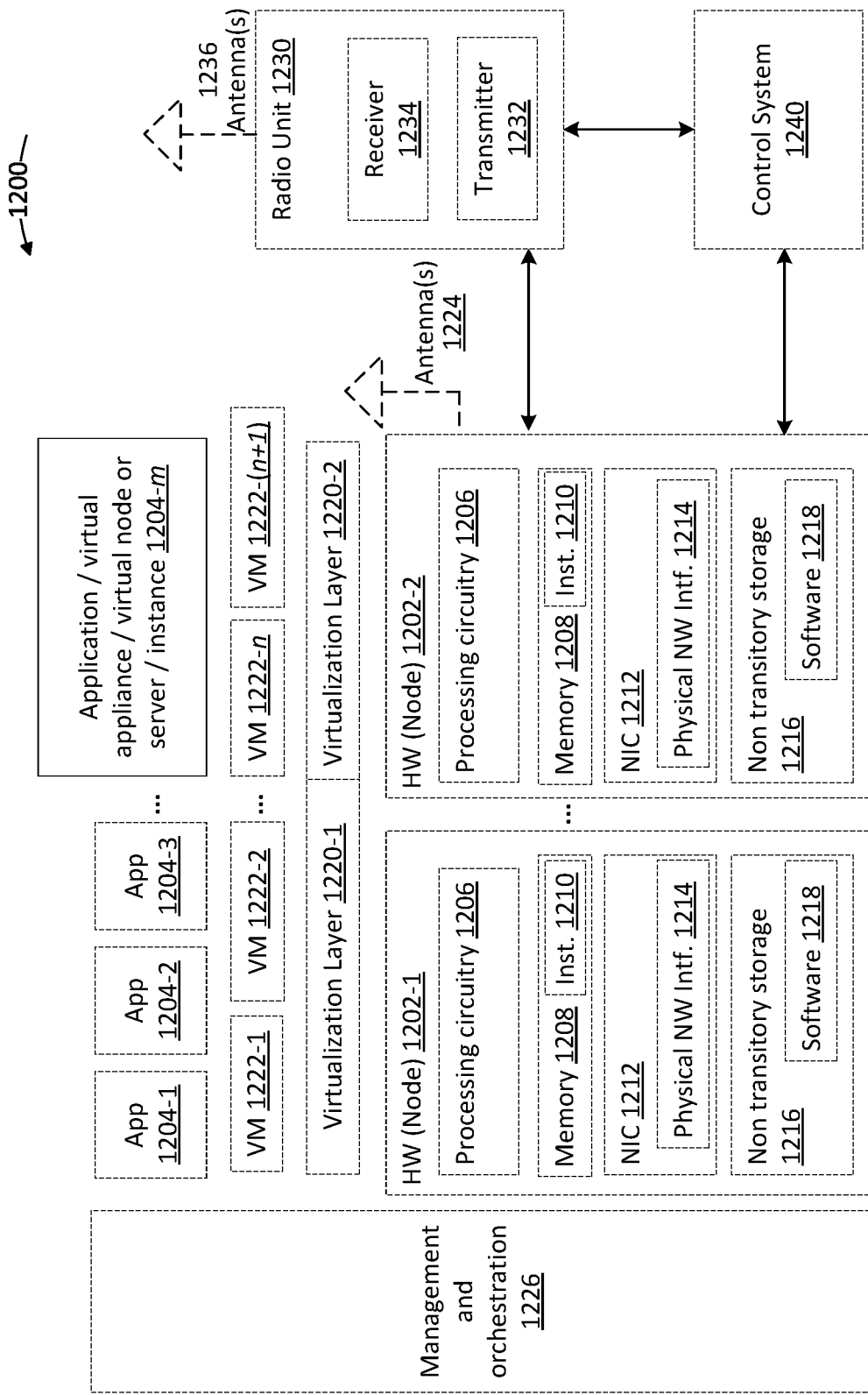
FIG. 12 is a block diagram of one embodiment of a virtualization environment.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all the functions described herein may be implemented as virtual components executed by one or more virtual machines implemented in one or more virtual environments 1200 hosted by one or more of hardware nodes 1202, e.g., nodes 1201-1 and 1202-2. Further, in embodiments in which the virtual node is not a radio access node or does not require radio connectivity (e.g., a core network node), then the network node may be entirely virtualized.

The functions may be implemented by one or more applications 1204 (which may alternatively be called software instances, virtual appliances, network functions, virtual nodes, virtual network functions, etc.) operative to implement some of the features, functions, and/or benefits of some of the embodiments disclosed herein. Applications 1204 are run in virtualization environment 1200 which provides hardware 1202 comprising processing circuitry 1206 and memory 1208. Memory 1208 contains instructions 1210 executable by processing circuitry 1206 whereby an instance of an application 1204 is operative to provide one or more of the features, benefits, and/or functions disclosed herein. Illustrated applications or application instances include application 1204-1, 1204-2, 1204-3, through 1204-*m*, where m is an integer value representing the m-th application or application instance in the virtualization environment 1200.

Virtualization environment 1200, comprises general-purpose or special-purpose network hardware devices 1202 comprising a set of one or more processors or processing circuitry 1206, which may be commercial off-the-shelf (COTS) processors, dedicated Application Specific Integrated Circuits (ASICs), or any other type of processing circuitry including digital or analog hardware components or special purpose processors. Each hardware device may comprise memory 1208 which may be non-persistent memory for temporarily storing instructions 1210 or software executed by processing circuitry 1206. Each hardware device may comprise one or more network interface controllers (NICs) 1212, also known as network interface cards, which include physical network interface 1214. Each hardware device may also include non-transitory, persistent, machine-readable storage media 1216 having stored therein software 1218 and/or instructions executable by processing circuitry 1206. Software 1218 may include any type of software including software for instantiating one or more virtualization layers 1220 (also referred to as hypervisors and shown as layers 1220-1 and 1220-2 by way of example), software to execute virtual machines 1222 as well as software allowing it to execute functions, features and/or benefits described in relation with some embodiments described herein.

Virtual machines 1222, comprise virtual processing, virtual memory, virtual networking or interface and virtual storage, and may be run by a corresponding virtualization layer 1220 or hypervisor. Example virtual machines appear in the illustration as VMs 1220-1, 1222-2, . . . 1222-n, and 1222-(n+1). Different applications/application instances 1204 may be implemented on one or more of virtual machines 1222, and the implementations may be made in different ways.

During operation, processing circuitry 1206 executes software 1218 to instantiate the hypervisor or virtualization layer 1220, which may sometimes be referred to as a virtual machine monitor (VMM). Virtualization layer(s) 1220 may present a virtual operating platform that appears like networking hardware to the virtual machine(s) 1222.

As shown in FIG. 12, hardware 1202 may be a standalone network node with generic or specific components. Hardware 1202 may include or be associated with one or more antenna(s) 1224 and may implement some functions via virtualization. Alternatively, hardware 1202 may be part of a larger cluster of hardware (e.g. such as in a data center or customer premise equipment (CPE)) where many hardware nodes work together and are managed via management and orchestration (MANO) 1226, which, among others, oversees lifecycle management of applications 1204.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1222 may be a software implementation of a physical machine that runs programs as if they were executing on a physical, non-virtualized machine. Each of virtual machines 1222, and that part of hardware 1202 that executes that virtual machine, be it hardware dedicated to that virtual machine and/or hardware shared by that virtual machine with others of the virtual machines 1222, forms a separate virtual network elements (VNE).

Still in the context of NFV, Virtual Network Function (VNF) is responsible for handling specific network functions that run in one or more virtual machines 1222 on top of hardware networking infrastructure 1202 and corresponds to application 1204 in FIG. 12.

In some embodiments, one or more radio units 1230 that each include one or more transmitters 1232 and one or more receivers 1234 may be coupled to one or more antennas 1236. Radio units 1230 may communicate directly with hardware nodes 1202 via one or more appropriate network interfaces and may be used in combination with the virtual components to provide a virtual node with radio capabilities, such as a radio access node or a base station.

In some embodiments, some signaling can be effected with the use of control system 1240 which may alternatively be used for communication between the hardware nodes 1202 and radio units 1230.

Figure 13:
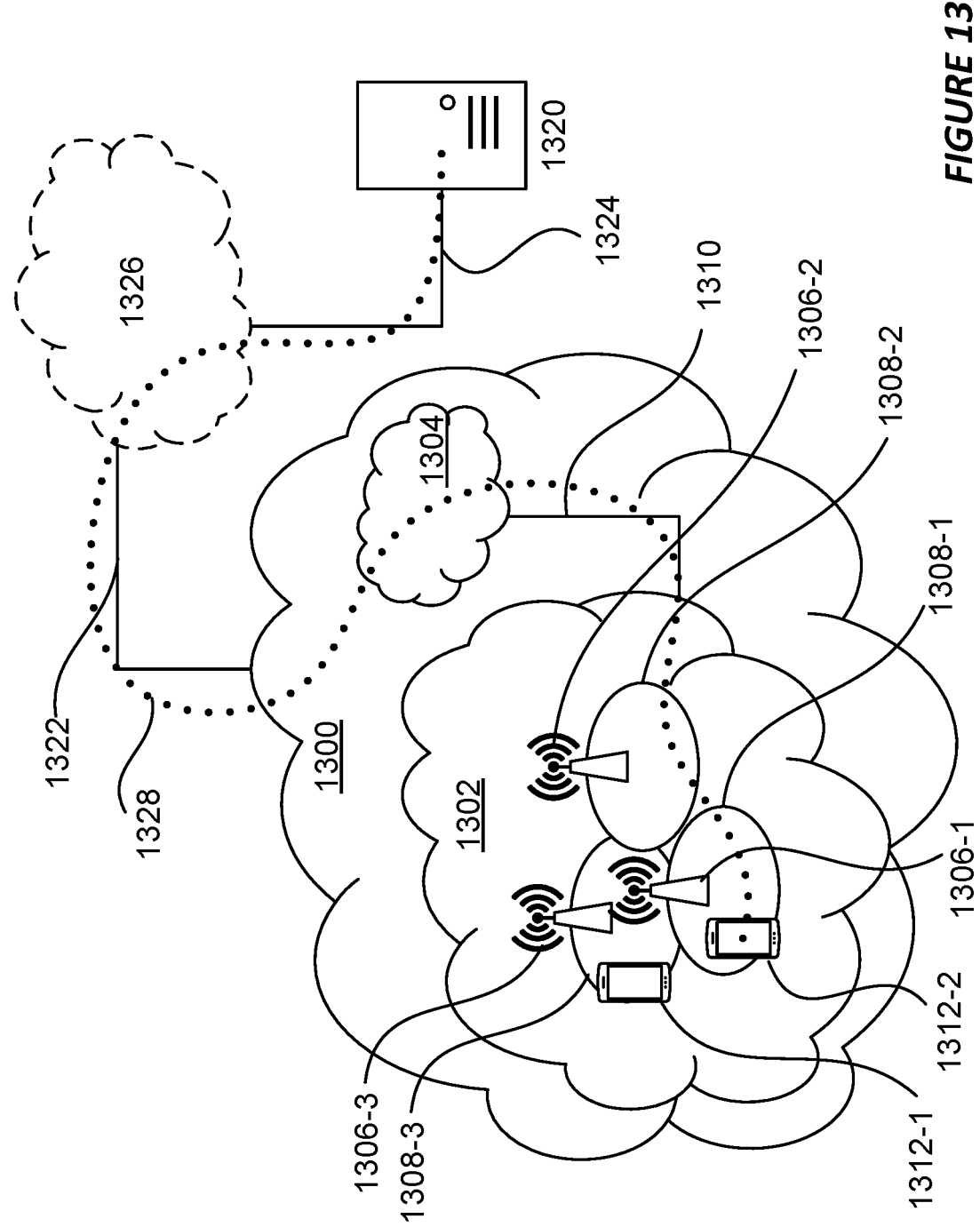
FIG. 13 is a block diagram of one embodiment of a communication system including a host computer, one or more base stations of a wireless communication network, and one or more wireless devices configured to access the host computer via the network.

FIG. 13 illustrates a telecommunication network connected via an intermediate network to a host computer in accordance with some embodiments. An example communication system includes a telecommunication network 1300, such as a 3GPP-type cellular network, which comprises an access network 1302, such as a radio access network, and a core network 1304. Access network 1302 comprises a plurality of base stations 1306-1, 1306-2, 1306-3, such as NBs, eNBs, gNBs or other types of wireless access points, each defining a corresponding coverage area 1308-1, 1308-2, 1308-3. Each base station 1306-1, 1306-2, 1306-3 is connectable to core network 1304 over a wired or wireless connection 1310. A first UE 1312-1 located in coverage area 1308-3 is configured to wirelessly connect to, or be paged by, the corresponding base station 1306-3. A second UE 1312-2 in coverage area 1308-1 is wirelessly connectable to the corresponding base station 1306-1. While a plurality of UEs 1312 (e.g., 1312-1 and 1312-2) are illustrated in this example, the disclosed embodiments are equally applicable to a situation where a sole UE 1312 is in the coverage area of a base station 1306 or where a sole UE 1312 is connecting to a corresponding base station 1306. Also, as explained above, a UE 1312 may connect (in an active state) to a combination of base stations using different RATs.

Telecommunication network 1300 is itself connected to host computer 1320, which may be embodied in the hardware and/or software of a standalone server, a cloud-implemented server, a distributed server or as processing resources in a server farm. Host computer 1320 may be under the ownership or control of a service provider or may be operated by the service provider or on behalf of the service provider. Connections 1322 and 1324 between telecommunication network 1300 and host computer 1320 may extend directly from core network 1304 to host computer 1320 or may go via an optional intermediate network 1326. Intermediate network 1326 may be one of, or a combination of more than one of, a public, private or hosted network; intermediate network 1326, if any, may be a backbone network or the Internet; in particular, intermediate network 1326 may comprise two or more sub-networks (not shown).

The communication system of FIG. 13 enables connectivity between the connected UEs 1312-1, 1312-2 and host computer 1320. The connectivity may be described as an over-the-top (OTT) connection 1328. Host computer 1320 and the connected UEs 1312, 1312-2 are configured to communicate data and/or signaling via OTT connection 1328, using access network 1302, core network 1304, any intermediate network 1326 and possible further infrastructure (not shown) as intermediaries. OTT connection 1328 may be transparent in the sense that the participating communication devices through which OTT connection 1328 passes are unaware of routing of uplink and downlink communications. For example, base station 1306 may not or need not be informed about the past routing of an incoming downlink communication with data originating from host computer 1320 to be forwarded (e.g., handed over) to a connected UE 1312. Similarly, base station 1306 need not be aware of the future routing of an outgoing uplink communication originating from the UE 1312 towards the host computer 1320.

Figure 14:
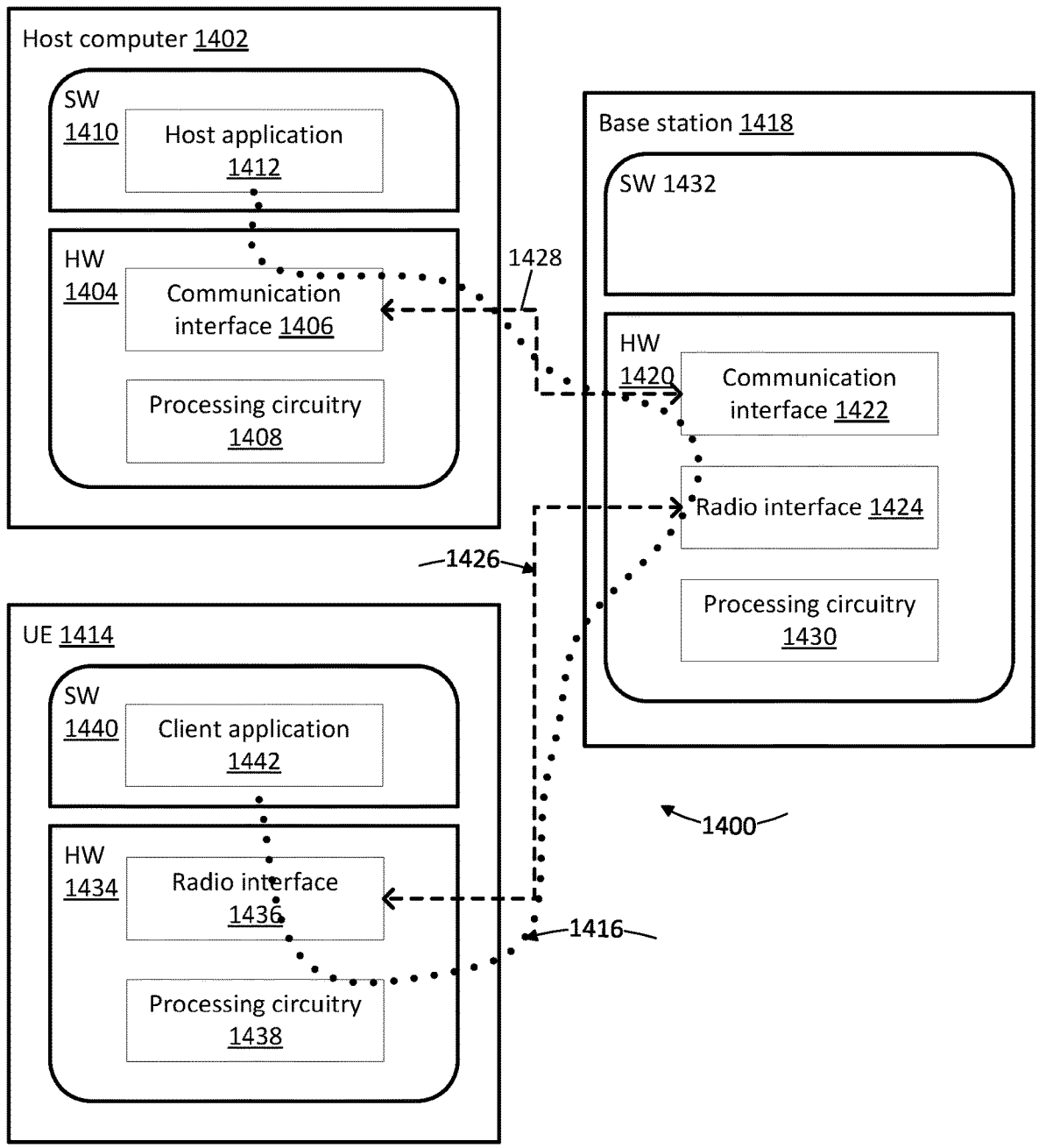
FIG. 14 is a block diagram of example embodiments of a host computer, a base station, and a wireless device.

FIG. 14 depicts a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 14.

In a communication system 1400, host computer 1402 comprises hardware 1404 including communication interface 1406 configured to set up and maintain a wired or wireless connection with an interface of a different communication device of communication system 1400. Host computer 1402 further comprises processing circuitry 1408, which may have storage and/or processing capabilities. Processing circuitry 1408 may comprise one or more programmable processors, application-specific integrated circuits, field programmable gate arrays or combinations of these (not shown) adapted to execute instructions. Host computer 1402 further comprises software 1410, which is stored in or accessible by host computer 1402 and executable by processing circuitry 1408. Software 1410 includes host application 1412. Host application 1412 may be operable to provide a service to a remote user, such as UE 1414 connecting via OTT connection 1416 terminating at UE 1414 and host computer 1402. In providing the service to the remote user, host application 1412 may provide user data which is transmitted using OTT connection 1416.

Communication system 1400 further includes base station 1418 provided in a telecommunication system and comprising hardware 1420 enabling it to communicate with host computer 1402 and with UE 1414. Base station 1418 may support one or more cells (not shown) which may provide coverage to UE 1414. The UE 1414 may be able to connect to combinations of the cells (including a combination of neighboring or overlapping cells supported by the base station 1418 or supported by two or more base stations 1418) when in an active state, and may select one of the cells to camp, in dependence on the levels of coverage provided to the UE by different combinations of cells.

Hardware 1420 of the base station 1418 may include communication interface 1422 for setting up and maintaining a wired or wireless connection with an interface of a different communication device of communication system 1400, as well as radio interface 1424 for setting up and maintaining at least wireless connection 1426 with UE 1414 located in a coverage area (not shown in FIG. 14) served by base station 1418. The wireless connection 1426 may be used to page the UE 1414, while the UE 1414 is in a dormant state and camping on a cell provided by the base station 1418. Communication interface 1422 may be configured to facilitate connection 1428 to host computer 1402. Connection 1428 may be direct, or it may pass through a core network (not shown in FIG. 14) of the telecommunication system and/or through one or more intermediate networks outside the telecommunication system. In the embodiment shown, hardware 1420 of base station 1418 further includes processing circuitry 1430, which may comprise one or more programmable processors, application-specific integrated circuits, field programmable gate arrays or combinations of these (not shown) adapted to execute instructions. Base station 1418 further has software 1432 stored internally or accessible via an external connection.

The UE 1414 is configured to use the communication system 1400, e.g., to connect to the host computer 1402. Hardware 1434 of the UE 1414 may include radio interface 1436 configured to set up and maintain wireless connection 1426 with one or more base stations serving a coverage area in which UE 1414 is currently located. Hardware 1434 of UE 1414 further includes processing circuitry 1438, which may comprise one or more programmable processors, application-specific integrated circuits, field programmable gate arrays or combinations of these (not shown) adapted to execute instructions. UE 1414 may be configured to perform a method for selecting a cell to camp on while the UE 1414 is in a dormant state, as discussed above. UE 1414 further comprises software 1440, which is stored in or accessible by UE 1414 and executable by processing circuitry 1438. Software 1440 includes client application 1442. Client application 1442 may be operable to provide a service to a human or non-human user via UE 1414, with the support of host computer 1402. In host computer 1402, an executing host application 1412 may communicate with the executing client application 1442 via OTT connection 1416 terminating at UE 1414 and host computer 1402. In providing the service to the user, client application 1442 may receive request data from host application 1412 and provide user data in response to the request data. OTT connection 1416 may transfer both the request data and the user data. Client application 1442 may interact with the user to generate the user data that it provides.

It is noted that host computer 1402, base station 1418 and UE 1414 illustrated in FIG. 14 may be similar or identical to host computer 1320, one of base stations 1306-1, 1306-2, 1306-3 and one of UEs 1312-1 and 1312-2 of FIG. 13, respectively. This is to say, the inner workings of these entities may be as shown in FIG. 14 and independently, the surrounding network topology may be that of FIG. 13.

In FIG. 14, OTT connection 1416 has been drawn abstractly to illustrate the communication between host computer 1402 and UE 1414 via base station 1418, without explicit reference to any intermediary devices and the precise routing of messages via these devices. Network infrastructure may determine the routing, which it may be configured to hide from UE 1414 or from the service provider operating host computer 1402, or both. While OTT connection 1416 is active, the network infrastructure may further take decisions by which it dynamically changes the routing (e.g., on the basis of load balancing consideration or reconfiguration of the network).

Wireless connection 1426 between UE 1414 and base station 1418 is in accordance with the teachings of the embodiments described throughout this disclosure and may be one of a plurality of connections—e.g., a DC or CA "connection" comprising two or more connections between the UE 1414. One or more of the various embodiments improve the performance of OTT services provided to UE 1414 using OTT connection 1416, in which wireless connection 1426 forms the last segment. More precisely, the teachings of these embodiments may improve the speed with which the UE 1414 can use CA or DC after entering an active state from a dormant state and thereby provide benefits such as reduced latency and improved throughput. A measurement procedure may be provided for the purpose of monitoring data rate, latency and other factors on which the one or more embodiments improve. There may further be an optional network functionality for reconfiguring OTT connection 1416 between host computer 1402 and UE 1414, in response to variations in the measurement results. The measurement procedure and/or the network functionality for reconfiguring OTT connection 1416 may be implemented in software 1410 and hardware 1404 of host computer 1402 or in software 140 and hardware 1434 of UE 1414, or both. In embodiments, sensors (not shown) may be deployed in or in association with communication devices through which OTT connection 1416 passes; the sensors may participate in the measurement procedure by supplying values of the monitored quantities exemplified above, or supplying values of other physical quantities from which software 1410, 1440 may compute or estimate the monitored quantities. The reconfiguring of OTT connection 1416 may include message format, retransmission settings, preferred routing etc.; the reconfiguring need not affect base station 1418, and it may be unknown or imperceptible to base station 1418. Such procedures and functionalities may be known and practiced in the art. In certain embodiments, measurements may involve proprietary UE signaling facilitating measurements by the host computer 1402 of throughput, propagation times, latency and the like. The measurements may be implemented in that software 1410 and 1440 cooperate to cause messages to be transmitted, in particular empty or "dummy" messages, using OTT connection 1416 while monitoring propagation times, errors, etc.

Figure 15:
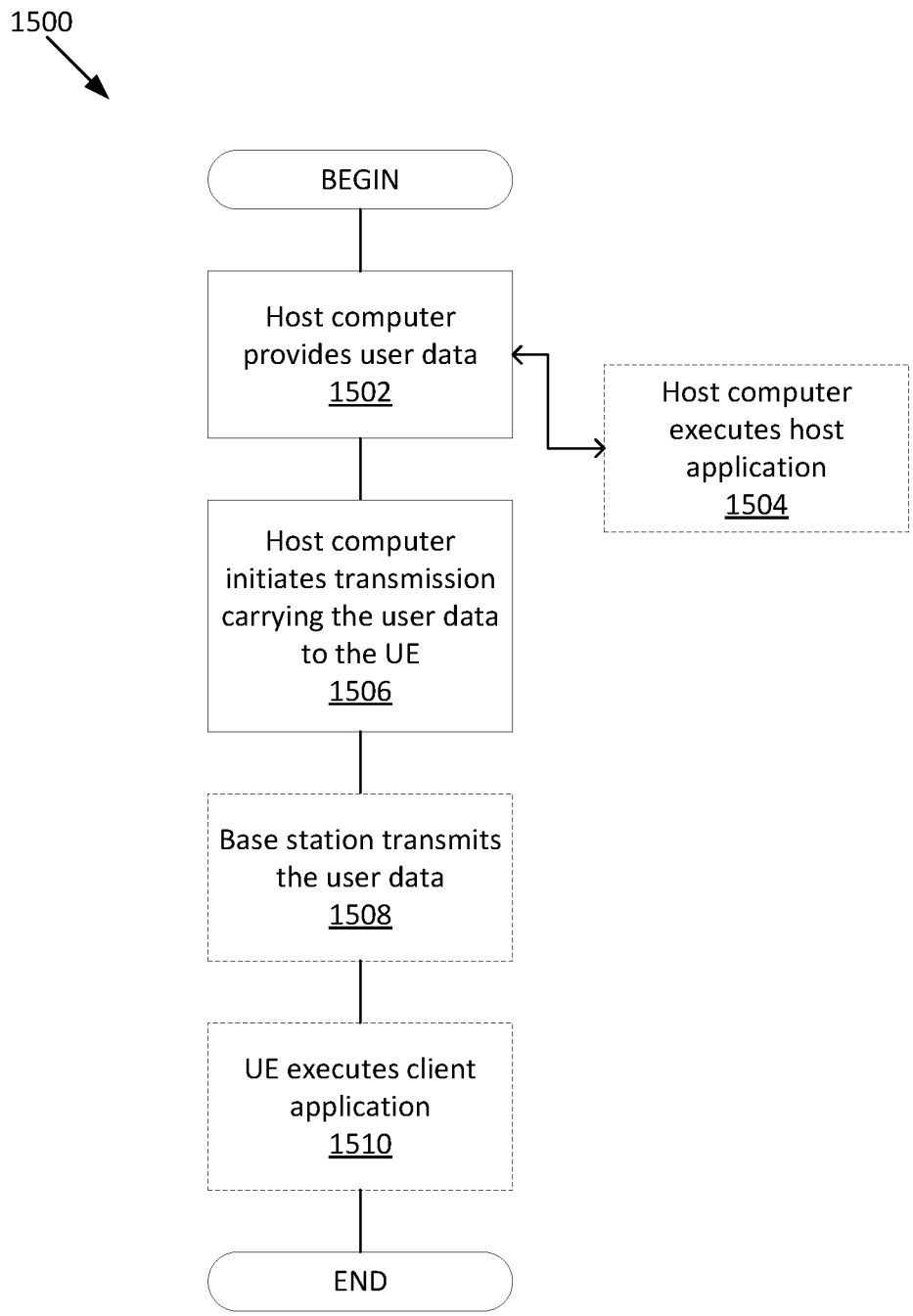
FIGS. 15-18 are logic flow diagram of example embodiments of methods of operation by various components of a communication system that includes a host computer, a base station of a wireless communication network, and a wireless device configured to access the host computer via the network.

FIG. 15 illustrates example methods 1500 implemented in a communication system including a host computer, a base station and a user equipment in accordance with some embodiments.

Specifically, FIG. 15 is a flowchart illustrating methods implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1502, the host computer provides user data. In sub-step 1504 (which may be optional) of step 1502, the host computer provides the user data by executing a host application. In step 1506, the host computer initiates a transmission carrying the user data to the UE. In step 1508 (which may be optional), the base station transmits to the UE the user data which was carried in the transmission that the host computer initiated, in accordance with the teachings of the embodiments described throughout this disclosure. In step 1510 (which may also be optional), the UE executes a client application associated with the host application executed by the host computer.

Figure 16:
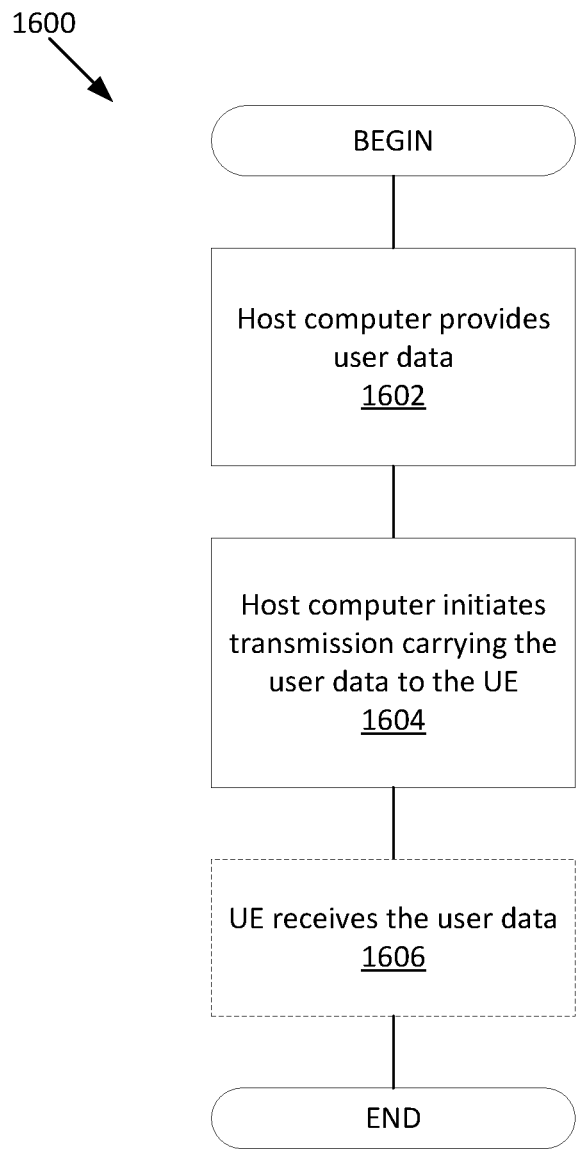

FIG. 16 illustrates example methods 1600 implemented in a communication system including a host computer, a base station and a user equipment in accordance with some embodiments.

Specifically, FIG. 16 depicts a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1602 of the method, the host computer provides user data. In an optional sub-step (not shown) the host computer provides the user data by executing a host application. In step 1604, the host computer initiates a transmission carrying the user data to the UE. The transmission may pass via the base station, in accordance with the teachings of the embodiments described throughout this disclosure. In step 1606 (which may be optional), the UE receives the user data carried in the transmission.

Figure 17:
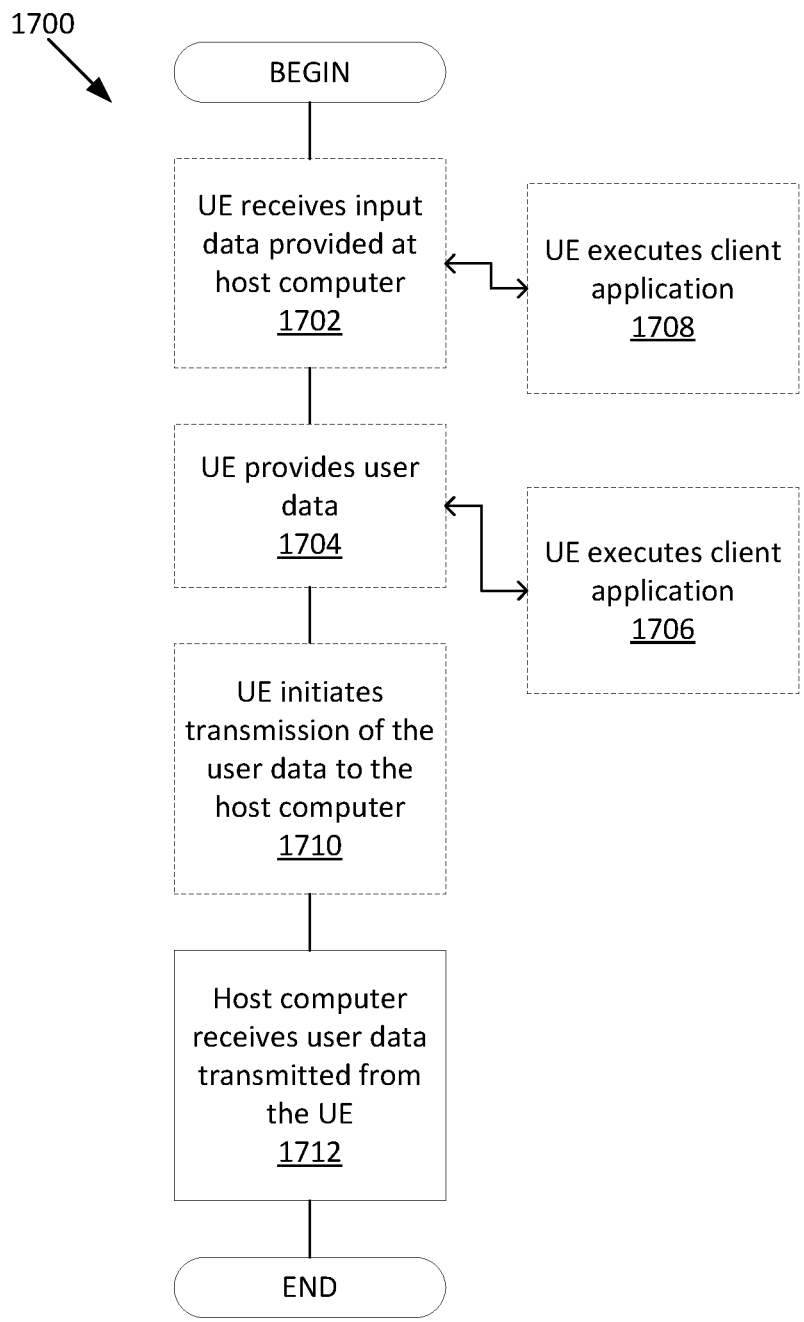

FIG. 17 illustrates example methods 1700 implemented in a communication system including a host computer, a base station and a user equipment in accordance with some embodiments.

Specifically, FIG. 17 depicts a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1702 (which may be optional), the UE receives input data provided by the host computer. Additionally, or alternatively, in step 1704, the UE provides user data. In sub-step 1706 (which may be optional) of step 1704, the UE provides the user data by executing a client application. In sub-step 1708 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1710 (which may be optional), transmission of the user data to the host computer. In step 1712 of the method, the host computer receives the user data transmitted from the UE, in accordance with the teachings of the embodiments described throughout this disclosure.

Figure 18:
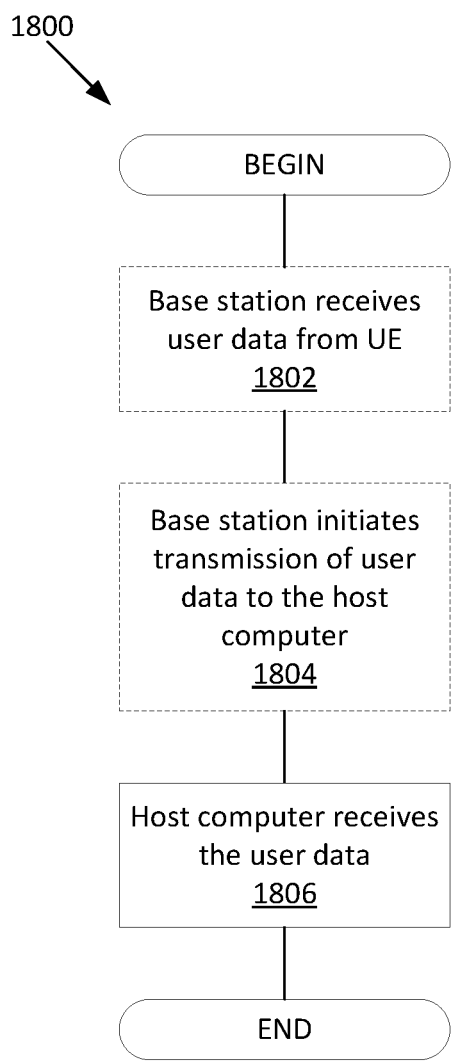

FIG. 18 illustrates example methods implemented in a communication system including a host computer, a base station and a user equipment in accordance with some embodiments.

Specifically, FIG. 18 depicts a flowchart illustrating a method 1800 implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1802 (which may be optional), in accordance with the teachings of the embodiments described throughout this disclosure, the base station receives user data from the UE. In step 1804 (which may be optional), the base station initiates transmission of the received user data to the host computer. In step 1806 (which may be optional), the host computer receives the user data carried in the transmission initiated by the base station.

Figure 19:
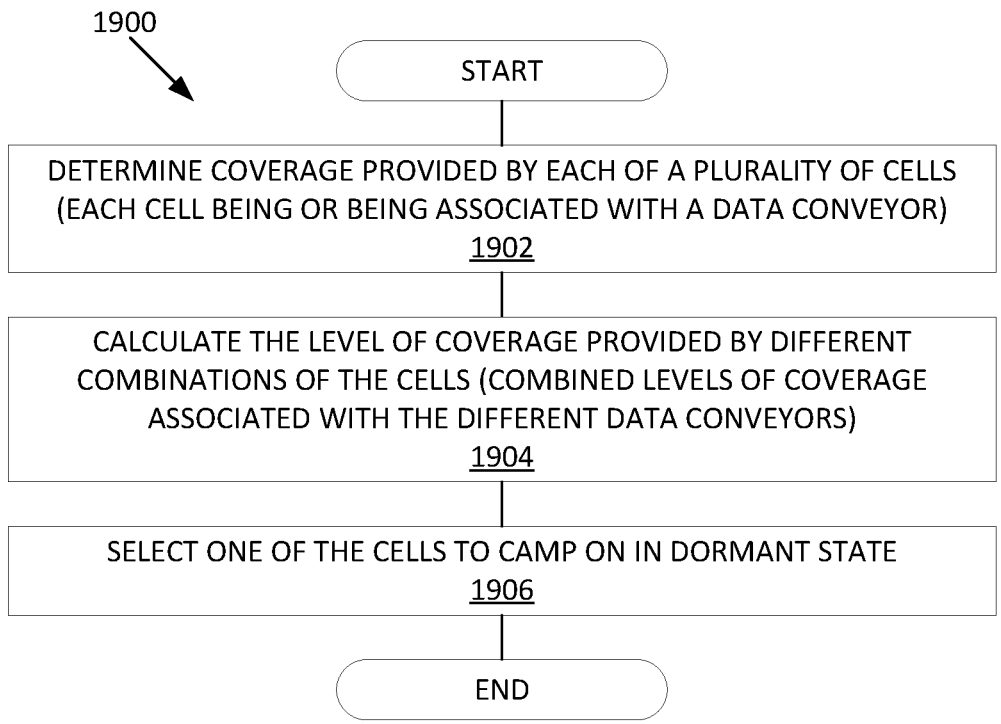
FIG. 19 is a logic flow diagram of another embodiment of a method of operation by a wireless device.

FIG. 19 illustrates another example method 1900 of operation by a UE. The method 1900 includes determining (Block 1902) of the coverage provided by each of a plurality of cells, each cell being or being associated with a respective data conveyor. The cells considered by the UE may differ in any one or more of the following respects: the RAT(s) used; the beam(s) used; the frequency or frequencies used; and the bandwidth-parts used. The UE determines the coverage levels, for example, using measurements performed by the UE, and the UE may use one or more defined thresholds to qualify the measurements, such as minimum-acceptable signal strength or quality thresholds. The method 1900 further includes the UE calculating (Block 1904) the level of coverage provided by different combinations of the cells. The method 1900 further includes the UE selecting (Block 1906) a cell to camp on in a dormant state. In the selecting, the technical capabilities of the UE to support different combinations of cells is taken into consideration—i.e., the UE implicitly or expressly considers the multi-cell possibilities available to it through respective combinations among the plurality of cells that are candidates for camping-cell selection by the UE. The selecting may use a selection algorithm which includes selection priority criteria. The selection priority criteria may vary depending on the number and type of cells among the plurality of cells that provide coverage to the wireless device. The selection priority criteria may be are received by the wireless device from dedicated signaling or broadcast signaling, or wherein the selection priority criteria are specified by or hard-coded into the UE. Once selected, the UE may camp on the selected data conveyor when in a dormant state.

Figure 20:
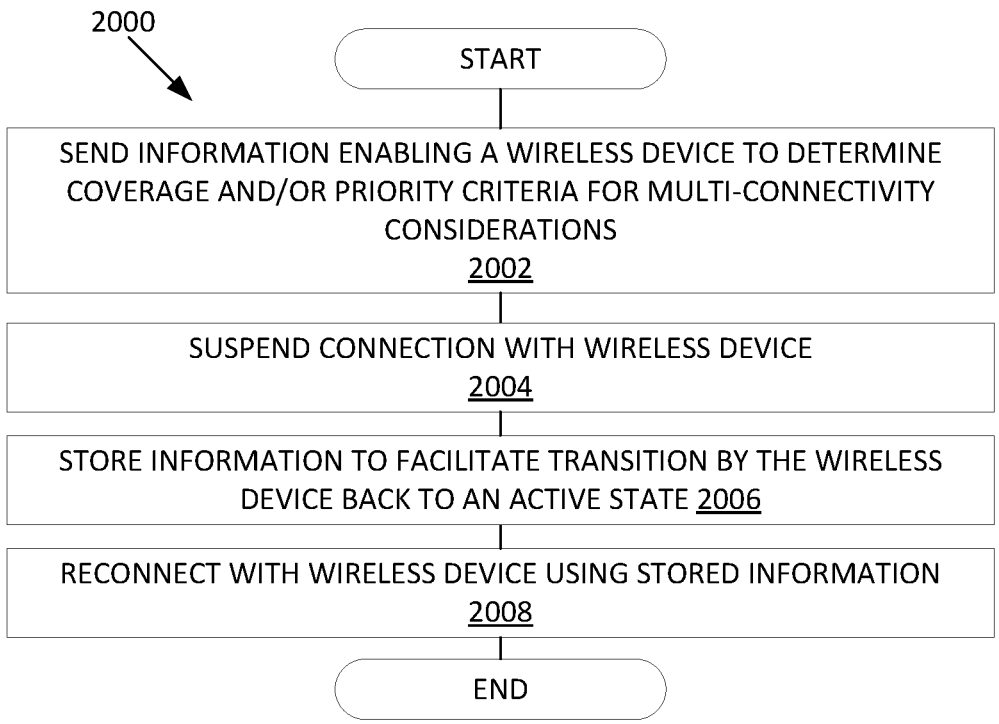
FIG. 20 is a logic flow diagram of another embodiment of a method of operation by a base station or other network node of a wireless communication network.

FIG. 20 illustrates an example method 2000 of operation by a base station of a wireless communication network, such as an eNB. The steps of the method may be performed in differing orders, and not all steps are necessarily performed. The method 2000 includes sending (Block 2002) information enabling a wireless device to determine coverage and/or priority criteria for multi-cell configurations with respect to a plurality of cells provided by the base station and/or the base station and one or more neighboring base stations. The priority criteria comprises, for example, priority criteria that allow the wireless device to calculate the combined levels of coverage corresponding to respective combinations of the cells, with each such combination representing a multi-cell configuration. The method 2000 includes the base station suspending (Block 2004) a connection between the wireless device and the base station, e.g., in association with the wireless device transitioning to a dormant state. The method 2000 further includes the base station storing (Block 2006) information in the base station that facilitate transition by the wireless device back to the active state, i.e., having an active connection to the base station. Correspondingly, the method 2000 includes the base station reconnecting (Block 2008) with the wireless device, using the stored information to facilitate the reconnection.

Figure 21:
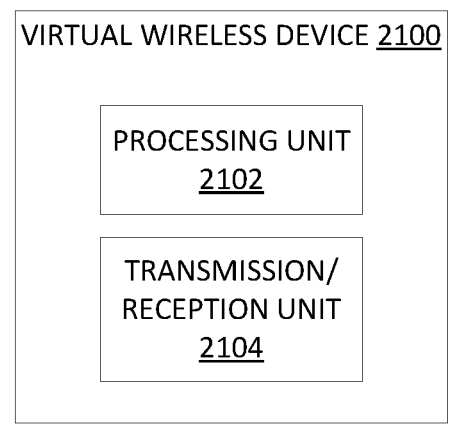
FIG. 21 is a block diagram of one embodiment of a virtualized wireless device.

FIG. 21 illustrates an example implementation of a wireless device as a virtualized wireless device 2100, such as may be used in a wireless communication network, e.g., the network 10 depicted in FIG. 10. The virtualized wireless device 2100 or "apparatus 2100" is operable to carry out the example method 1900, or any of the other method embodiments and variations described herein for a wireless device or UE. It is also to be understood that the method of FIG. 1900 is not necessarily carried out solely by apparatus 2100. At least some operations of the method can be performed by one or more other entities.

Apparatus 2100 includes a processing unit 2102 that is realized or otherwise instantiated using underlying processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. The processing unit 2102 provides the wireless-device functionality described herein, in cooperation with a transmission/reception unit 2104.

Figure 22:
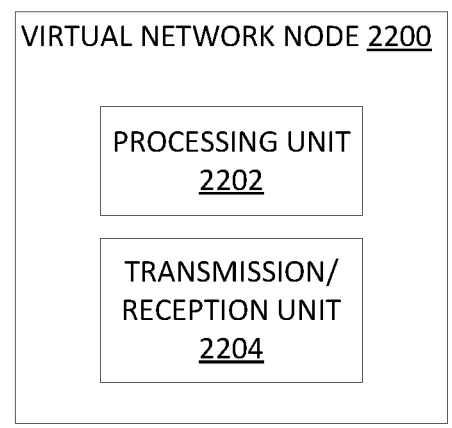
FIG. 22 is a block diagram of one embodiment of a virtualized base station or other network node of a wireless communication network.

FIG. 22 depicts an example of a virtualized network node 2200, also referred to as an "apparatus 2200". The apparatus 2200 is configured a core network node, a radio access point, or another type of network node in a wireless communication network, such as the network 10 depicted in FIG. 10. In any case, the apparatus 2200 provides all or some of the network-side functionality described herein, e.g., it operates as a radio access point 22 or other variation of a network node 52, as described earlier herein.

Apparatus 2200 includes a processing unit 2202 that is realized or otherwise instantiated using underlying processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. The processing unit 2202 provides the network-node functionality described herein, in cooperation with a transmission/reception unit 2204, which is configured for inter-node signaling, e.g., data network signaling, and/or is configured to support wireless signaling via an air interface.

With the above examples in mind, a method performed by a wireless device according to one embodiment, involves selecting a data conveyor to camp on while the wireless device is in a dormant state. The method comprises: determining coverage provided to the wireless device by each of a plurality of data conveyors; calculating the level of coverage provided to the wireless device by different combinations of data conveyors from among the plurality of data conveyors; and selecting a data conveyor to camp on using the calculated levels of coverage provided to the wireless device by the different combinations of data conveyors.

The foregoing method includes, for example, determining coverage provided by a given data conveyor by evaluating the coverage provided by the given data conveyor against a threshold. The threshold is based on, for example, at least one of a signal quality, a signal power and a signal to noise ratio. The threshold may be received by the wireless device from dedicated signaling or broadcast signaling or may be hard-coded into the wireless device. Different thresholds may be used for different cells or data conveyors.

Selecting a data conveyor to camp on depends on a selection algorithm which includes selection priority criteria corresponding to the multi-cell possibilities available to the wireless device with respect to the cells under consideration for camping-cell selection. The selection priority criteria vary, for example, depending on the number and type of data conveyors represented by the cells that provide coverage to the wireless device. Put another way, the selection criteria may vary according to the particulars of the radio access points that provide sufficient signal quality or strength for the wireless device, in terms of type, characteristics, coverage areas, RATs, frequencies, beamforming details, etc.

As noted, the selection priority criteria are received by the wireless device from dedicated signaling or broadcast signaling or are hard-coded into the wireless device.

The wireless device perform measurements to determine the levels of coverage provided by the respective cells, which may be understood as determining, at least as an initial step, the signal strength or signal quality provided to the wireless device on respective radio-frequency carriers corresponding to the same or different RATs and the same or different frequencies, with the various radio-frequency carriers provided by one or more radio access points 22 of a wireless communication network 10.

In an example implementation, the device repeats the determining, calculating and selecting steps, e.g., periodically while the wireless device remains in a dormant state. The measurements may be performed only during an initial window upon the wireless device entering a dormant state—e.g., during a beginning interval upon transitioning from an active state to the dormant state. As such, the device may consider multi-cell possibilities when performing cell selection during an initial window upon entry into the dormant state and may use a different selection technique later during the same dormant state. For example, upon transitioning to the dormant state, the device uses multi-cell priorities for camping-cell selection during an initial window, and then considers only conventional camping-cell priorities after the window ends, e.g., convention RAT and frequency prioritizations.

More broadly, the wireless device may later switch to another method for camping-cell selection after multi-cell measurements are no longer being performed and the wireless device remains in a dormant state.

Further, if the measurements indicate that a single data conveyor provides a higher level of coverage to the wireless device, as compared to the data conveyors associated with a multi-cell configuration, the wireless device selects the corresponding single-conveyor cell to camp on. Also, the wireless device may retain the measurements for use when the wireless device switches from a dormant state to an active state.

Calculating the level of coverage provided to the wireless device by a given combination of data conveyors from among the different combinations of data conveyors comprises, for example, the wireless device evaluating the level of coverage provided by each of the involved cells. The level of coverage provided by each cell is evaluated against a predetermined threshold, and the associated data conveyor is considered to not provide coverage to the device if the level of coverage provided by the cell does not satisfy the predetermined threshold.

All such operations may incorporate consideration of the technical capabilities of the wireless device to support different combinations of cells/data conveyors. Further, the camping-cell selection operations may account for the number of combinations available for consideration. For example, the priority given by the device to a given cell/data conveyor for ranking in camping-cell selection is proportional to the number of combinations in which the cell/data conveyor belongs. That is, a given cell may be used in three different multi-cell configurations and, therefore, has a higher priority for selection than a cell that may be used for only one or two different multi-cell configurations. Of course, the degree to which such priority weightings apply may also depend on the level of service (throughputs) expected for each of the multi-cell configurations involved.

Any given data conveyor may be used for various signaling between the wireless device and the network, and the method may include the wireless device providing or otherwise generating user data and forwarding the user data to a host computer via the transmission to the base station.

An example method performed by a base station for facilitating the camping of a wireless device while the wireless device is in a dormant state includes: suspending a connection between the wireless device and the base station while the wireless device is in a dormant state. The base-station method may further include sending, to the wireless device, information allowing the wireless device to determine coverage provided to the wireless device by one or more cells or associated data conveyors supported by the base station. The base station, for example, supports a plurality of data conveyors, and the data conveyors differ from one another in at least one of: the RAT, used; the cell used; the beam used; the frequency or frequencies used; and the bandwidth-parts used.

The base station may also store information that allows the wireless device to resume full connectivity when the wireless device switches from a dormant state to an active state. Further, the base station may send, to the wireless device, a threshold for use in evaluating the coverage provided by a given cell or associated data conveyor. The base station sends the threshold using direct signaling, or broadcasts it, e.g., in SI. Additionally, or alternatively, the base station sends, to the wireless device, selection priority criteria for use in camping-cell selection priorities, to account for multi-cell possibilities afforded to the wireless device by the cells under consideration for camping-cell selection. The selection priority criteria are for use, by the wireless device, in determining the level of coverage provided to the wireless device by different combinations of the cells.

The base station sends the selection priority criteria by direct signaling or by broadcasting.

The base station may further connect (reconnect) with the wireless device when the wireless device switches from a dormant state to an active state. For example, the wireless device connects to the base station and the base station obtains user data from the wireless device and forwards the user data to a host computer or another wireless device.

An example wireless device includes processing circuitry configured to perform any of the steps of the above-described device method(s), along with power supply circuitry configured to supply power to the wireless device.

An example base station includes processing circuitry configured to perform any of the steps of any of the above-described network-node methods, along with power supply circuitry configured to supply power to the base station.

An example UE for selecting a cell to camp on while in a dormant state includes: an antenna configured to send and receive wireless signals; radio front-end circuitry connected to the antenna and to processing circuitry and configured to condition signals communicated between the antenna and the processing circuitry. In turn, the processing circuitry is configured to carry out any of the steps of the above-described device methods. The example UE further includes an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

An example communication system includes a host computer comprising: processing circuitry configured to provide user data; and a communication interface configured to forward the user data to a cellular network for transmission to a user equipment (UE). The cellular network comprises a base station having a radio interface and processing circuitry, the processing circuitry of the base station is configured to perform any of the steps of any of the network-node methods described herein.

The communication system may be viewed as including the base station, wherein the subject UE is configured to communicate with the base station, e.g., to use the base station for communicating with the host computer.

The processing circuitry of the host computer, for example, is configured to execute a host application, thereby providing user data for the UE. Correspondingly, the UE comprises processing circuitry configured to execute a client application associated with the host application.

Correspondingly, an example method implemented in a communication system including a host computer, a base station and a user equipment (UE), includes: at the host computer, providing user data; and at the host computer, initiating a transmission carrying the user data to the UE via a cellular network comprising the base station, wherein the base station performs any of the steps of any of the network-node methods described herein. The example method further includes the base station transmitting the user data received from the host computer, for reception by the UE. The user data is provided at the host computer, for example, by executing a host application, the and method further includes, at the UE, executing a client application associated with the host application. The UE here is configured to communicate with the base station via an air interface using RF signaling, and the UE includes a radio interface and processing circuitry configured to performs any of the wireless-device/UE functions described herein.

An example communication system includes a host computer comprising processing circuitry configured to provide user data, and a communication interface configured to forward user data to a cellular network for transmission to a user equipment (UE). The UE comprises a radio interface and processing circuitry, and the UE is configured to perform any of the steps of any the wireless-device methods described herein. As noted, the processing circuitry of the host computer is configured to execute a host application, thereby providing the user data and the processing of the UE circuitry is configured to execute a client application associated with the host application.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a wireless device with respect to a cellular network, the method comprising:
   making radio signal measurements with respect to individual cells of the cellular network;
   determining from the radio signal measurements that a plurality of cells is available for selection as a camping cell;
   determining that the plurality of cells includes all cells from one or more multi-cell configurations mutually supported by the cellular network and the wireless device for serving the wireless device in multi-connectivity, wherein each multi-cell configuration represented in the plurality of cells is referred to as a possible multi-cell configuration and each cell belonging to one of the one or more possible multi-cell configurations is referred to as a multi-connectivity cell;
   incorporating multi-cell prioritizations associated with the one or more possible multi-cell configurations into a ranking of the plurality of cells, to generate a biased ranking of the plurality of cells that biases camping cell selection by the wireless device towards multi-connectivity cell selection;
   selecting, based on the biased ranking, one cell from among the plurality of cells as a camping cell; and
   camping on the selected cell while the wireless device is in the dormant state.

2. The method of claim 1,
   wherein incorporating the multi-cell prioritizations comprises ranking the cells in the plurality of cells according to the respective radio signal measurements and applying measurement offsets to the multi-connectivity cells according to respective prioritizations of the possible multi-cell configurations, to increase the ranking of the multi-connectivity cells.

3. The method of claim 2, wherein incorporating the multi-cell prioritizations comprises prioritizing the multi-connectivity cells of each possible multi-cell configuration according to a combination of coverage levels provided by each possible multi-cell configuration, as indicated by the respective radio signal measurements corresponding to the multi-connectivity cells belonging to each possible multi-cell configuration.

4. A wireless device comprising:
   a radio transceiver configured for communicating with radio nodes of a cellular network;
   processing circuitry configured to:
      make radio signal measurements with respect to individual cells of the cellular network, via the radio transceiver;
      determine from the radio signal measurements that a plurality of cells is available for selection as a camping cell;
      determine that the plurality of cells includes all cells from one or more multi-cell configurations mutually supported by the cellular network and the wireless device for serving the wireless device in multi-connectivity, wherein each multi-cell configuration represented in the plurality of cells is referred to as a possible multi-cell configuration and each cell belonging to one of the one or more possible multi-cell configurations is referred to as a multi-connectivity cell;
      incorporate multi-cell prioritizations associated with the one or more possible multi-cell configurations into a ranking of the plurality of cells, to generate a biased ranking of the plurality of cells that biases camping cell selection by the wireless device towards multi-connectivity cell selection;
      select, based on the biased ranking, one cell from among the plurality of cells as a camping cell; and
      cause the wireless device to camp on the selected cell while the wireless device is in the dormant state; and
   power supply circuitry configured to supply power to the wireless device.

5. The wireless device of claim 4, wherein the processing circuitry is configured to incorporate the multi-cell prioritizations by ranking the cells in the plurality of cells according to the respective radio signal measurements and applying measurement offsets to the multi-connectivity cells according to respective prioritizations of the possible multi-cell configurations, to increase the ranking of the multi-connectivity cells.

6. The wireless device of claim 5, wherein the processing circuitry is configured to incorporate the multi-cell prioritizations by prioritizing the multi-connectivity cells of each possible multi-cell configuration according to a combination of coverage levels provided by each possible multi-cell configuration, as indicated by the respective radio signal measurements corresponding to the multi-connectivity cells belonging to each possible multi-cell configuration.

* * * * *